US008229180B2

(12) United States Patent
Baloch et al.

(10) Patent No.: US 8,229,180 B2
(45) Date of Patent: Jul. 24, 2012

(54) SYSTEM AND METHOD FOR AUTOMATIC DETECTION OF ANATOMICAL FEATURES ON 3D EAR IMPRESSIONS

(75) Inventors: Sajjad Hussain Baloch, Monmouth Junction, NJ (US); Rupen Melkisetoglu, Princeton, NJ (US); Sergei Azernikov, Plainsboro, NJ (US); Alexander Zouhar, Lawrenceville, NJ (US); Tong Fang, Morganville, NJ (US)

(73) Assignee: Siemens Audiologische Technik GmbH, Erlangen (DE)

( * ) Notice: Subject to any disclaimer, the term of this patent is extended or adjusted under 35 U.S.C. 154(b) by 406 days.

(21) Appl. No.: 12/603,928

(22) Filed: Oct. 22, 2009

(65) Prior Publication Data

US 2010/0103170 A1    Apr. 29, 2010

Related U.S. Application Data

(60) Provisional application No. 61/108,569, filed on Oct. 27, 2008.

(51) Int. Cl.
*G06K 9/00*    (2006.01)

(52) U.S. Cl. .............. 382/115; 382/128; 345/420
(58) Field of Classification Search .............. 382/128, 382/115; 345/420
See application file for complete search history.

(56) References Cited

OTHER PUBLICATIONS

Zouhar et al: "Anatomically-Aware, Automatic, and Fast Registration of 3D Ear Impression Models", 3DPVT'06, IEEE, 2006.*

* cited by examiner

*Primary Examiner* — Matthew Bella
*Assistant Examiner* — Ruiping Li
(74) *Attorney, Agent, or Firm* — Donald B. Paschburg; F. Chau & Associates, LLC

(57) ABSTRACT

A method for detecting anatomical features in 3D ear impressions includes receiving a 3D digital image of a 3D ear impression, obtaining a surface of the ear impression from the 3D image, analyzing the surface with one or more feature detectors, the detectors adapted to detecting generic features, including peak features, concavity features, elbow features, ridge features, and bump features, and derived features that depend on generic features or other derived features, and forming a canonical ear signature from results of the detectors, where the canonical ear signature characterizes the 3D ear impression.

24 Claims, 19 Drawing Sheets

Three random Second Bend Plane detection results.

Shell detailing and modeling

Illustration of a human ear and a 3D impression.

Point feature set.

Plane feature set.

Curve feature set.

Area feature set.

Elbow Detection.

Two planes (shown red) define the region of interest $M_r$ in the computation of $t_0$-sensitive elbow (yellow).

The correspondence between a contour $c_p$ and the reference contour $c_r$ shown with dotted lines.

Automatic detection versus ground truth.

Automatic detection of the inter-tragal notch and the crus-side canal ridge.

Detection of inter-tragal notch, crus-side canal ridge, and inter-tragal notch flare.

Three random Second Bend Plane detection results.

Three random Bulbous Canal Area detection results.

Feature-based shell segmentation.

| Generic characterization | Anatomical Features |
|---|---|
| Peak | Canal Tip, Concha Peak, Helix Peak |
| Concavity | Center of Tragus, Center of Anti-Tragus, Center of Anti-Helix, Center of Crus |
| Elbow | First Bend, Second Bend |
| Ridge | Inter-Tragal Notch, Crus Side Canal Ridge, Crus-Helix Ridge |
| Bulbous | Canal Bulbous |

TABLE I
GENERIC CHARACTERIZATION OF ANATOMICAL FEATURES

| Feature | Mean | Variance |
|---|---|---|
| Inter-tragal notch top | 0.25 | 1.44 |
| Anti-tragus | 2.36 | 3.14 |
| Tragus | 1.76 | 2.16 |
| Anti-helix | 2.43 | 3.55 |
| Inter-tragal notch flare | 0.67 | 1.13 |
| Canal tip | 0.7 | 1.01 |
| Crus center | 1.77 | 2.28 |
| Helix peak | 0.97 | 2.35 |
| Crus-concha intersection | 1.51 | 3.21 |

TABLE II
MEAN SIMILARITY MEASURES

Algorithm 1: Peak Detection
Input: Shell surface $M$, resolution $K$, Maximum height $H$, Tolerance $\varepsilon$
Output: Peak $p$
1 begin
2 Orient $M$ in a local coordinate system
3 Find scanning plane normal $\mathbf{n} \parallel$ z-axis
4 $p \leftarrow$ FindCriticalPoint ($M, O, H, \mathbf{n}, K, \varepsilon$)
5 end

---

Algorithm 3: Concavity Detection
Input: Shell surface $M$
Output: Center of Concavity $p_c$
1 begin
2 Identify a region of interest $M_r \subset M$
3 Specify orthogonal directions $v_1, v_2$ along $M_r$
4 Scan $M_r$ along $v_1$ to generate a profile of contours $c_j$
5 Fit splines to $c_j$
6 Analyze $c_j$ to identify segments that are concave
7 Compute an average of the points of lowest curvature on such segments $c_j$ as a seed point
8 Scan $M_r$ along $v_2$ at the seed point to push it deeper in the valley
9 Step 8 may be repeated iteratively until convergence, alternating between $v_1$ and $v_2$
10. Grow concave region outward from seed point.
11 end

FIG. 18B

Algorithm 2: FindCriticalPoint

Input: Shell surface $M$, Starting height $h_s$, Ending height $h_e$, Scanning normal $\mathbf{n}$, Resolution $K$, Tolerance $\varepsilon$

Output: Critical point $p_c$

1 begin
2     Compute the step size $\delta h = (h_e - h_s)/K$
3     Scanning plane $P_0 \leftarrow \mathbf{n} + h_s$
4     Current Levelset $L_0 \leftarrow M \cap P_0$
5     for $k \leftarrow 1$ to $K$ do
6         $P_k = (h_s + k\delta h)\mathbf{n}$
7         $L_k \leftarrow M \cap P_k$
8         if Topology$(L_k) \neq$ Topology$(L_{k-1})$ then
9             if NumberOfContours$(L_k) <$ NumberOfContours $(L_{k-1})$ then
10                 $a \leftarrow k$
11                 $b \leftarrow k-1$
12             else
13                 $a \leftarrow k-1$
14                 $b \leftarrow k$
15         end
16         aList $\leftarrow L_b$
17         foreach contour in $L_a$ do
18             $C_b \leftarrow$ CorrespondingContour$(L_b,$ contour$)$
19             Remove(aLIST, $C_b$)
20         end
21         if ArcLength(aLIST)$< \varepsilon$ then
22             Critical point: $p_c \leftarrow$ CenterPoint(aLIST [1])
23             return $p_c$
24         else

FIG. 18C

| | | |
|---|---|---|
| 25 | | FindCriticalPoint( $M$, $h_s+(k-1)\delta h$, $h_s+k\delta h$, $\mathbf{n}$, $K$, $\varepsilon$ ) |
| 26 | | end |
| 27 | end | |
| 28 | end | |
| 29 | end | |

---

Algorithm 4: Elbow Detection

Input: Shell surface $M_r$

Output: Elbow plane $P^*$

1 begin

2 estimate centerline $c_p(t)$ of $M_r$

3 Construct cross-sectional profile of $M_r$

4 Establish correspondences across profile contours $\{c_p\}$ along radial direction

5 Represent profile with radial splines $\{r_i\}$

6 Identify high curvature points $q_i$ along individual splines $r_i$ (which correspond to the bend)

7 Discard points $q_i$ whose curvature is below threshold to obtain reduced set $Q'$

8 Consider all planar combinations of points in $Q'$ as defining candidate elbow planes

9 Use generalized Hough transform to map the candidate planes in the Hough Space.

10 The bend plane $P^*$ is found from the clustering of the mapped points in the Hough Space.

11 end

---

Algorithm 5: Ridge Detection

Input: Shell surface $M$

Output: Ridge $r(t)$

1 begin

2 Identify the starting and ending points ($p_s$ and $p_e$) of the ridge

3 Compute the geodesic $G_{p_s p_e}(t)$ that connects $p_s$, $p_e$ and minimizes the cost given in EQ. (1)

4 The ridge is $r(t) \leftarrow G_{p_s p_e}(t)$

5 end

FIG. 18D

Algorithm 6: Bump Detection
Input: Tubular Surface $M$
Output: Bump $M_B$
1 begin
2 Analyze cross sections of surface $M$ to generate set of profile contours HorizProfile
3 select reference contour $c_r$ at one end of $M$
3 foreach current contour in HorizProfile do
4     if Area(current contour) - reference area > $t_p$ then
5         b = FindBulbousPoints(current contour, reference contour)
6         BList += b
7     else
8.         update reference contour with current contour
9.     end
10 end
11 Perform region growing from each bulbous point in BList
12 end

---

Algorithm 7: FindBulbousPoints
Input: Bulbous Contour $c$, Reference Contour $r$
Output: Bulbous Points $b$
1 begin
2 Project points on the current contour onto the plane of the reference contour
3 For each projected current point, find the closest point on the reference contour to form a pair of corresponding points
4 Compare corresponding points by the distance of each point to its respective centroid
5 Decide if the projected current point is bulbous if its distance to its centroid is greater than the corresponding distance of the reference contour point.
6 end

FIG. 18E

Algorithm 8: Find Canal-Concha/Canal-Crus Intersection
Input: Concha Center $p_c$, Tragus Center $p_t$, Notch/Ridge $n(t)$
Output: Intersection point $p_i$
1 begin
2 find secondary geodesic $g$ connecting the end points $p_c$, $p_t$ using the weight function of EQ. (4).
3 find intersection point $p_i$ of $g$ with the notch/ridge $n(t)$

---

Algorithm 9: Find Crus Helix Ridge
Input: Shell surface $M$, Helix Peak $p_h$
Output: Crus Helix Ridge $r_h$
1 begin
2    Find the contour $B$ defining the shell opening at the bottom
3    Initialize weights $W = \{w(p) \leftarrow f(\kappa(p)) \forall p \in M\}$, where $f(\kappa(p))$ is a decreasing function of curvature that favors convex points
4    Initialize the arc length of the optimal ridge: $d^* \leftarrow$ HUGE_LENGTH
5    foreach point $q$ in $B$ do
6        find a weighted geodesic $g$ from surface $M$, end points $p_h$ and $q$, and weights $W$ using EQ. (4)
7        d ← ArcLength (g)
8        if d < d* then
9            $d^* \leftarrow d$
10           $r_h \leftarrow g$
11       end
12   end
13 end

FIG. 18F

Algorithm 10: Find Crus Area

Input: Shell surface $M$, Helix Peak Point $p_h$, Center of Concha $p_c$, Crus Helix Ridge $h(t)$, Crus-side canal ridge $r(t)$

Output: Crus Area $A_c$

1 begin
2     Initialize weights $W_w(p) \leftarrow f(\kappa(p))$ for weighted geodesic, where $f(\kappa(p))$ is a decreasing function of curvature that favors concave points
3     Find un-weighted helix-concha geodesic $g_{hc}$ from surface $M$, end points $p_h$ and $p_c$
4     Find crus pivot point $p_p$ as the lowest point on $g_{hc}$.
5     Find the weighted pivot-helix bottom geodesic $g_{bp}$ from surface $M$, end points $h(l)$ and $p_p$, and weights $W_w(p)$ that favors concave points
6     Find the weighted pivot-canal bottom geodesic $g_{pc}$ from surface $M$, end points $p_p$ and $r(l)$, and weights $W_w(p)$ that favors concave points
7     Create the boundary of the crus area $B_A \leftarrow (g_{bp}, g_{pc})$
8     Select a seed point $S$ on the region enclosed by $B_A$
9     grow region $A$ from seed point $S$, where $B_A$ is the boundary constraints
10 end

---

Algorithm 11: Find Crus Concha Intersection

Input: Shell surface $M$, Center of Crus $p_{cr}$, Crus Valley Plane $P_{cr}$, Center of Concha $p_c$, Center of Tragus $p_T$ Center of Anti-Tragus $p_A$

Output: Crus Concha Intersection $p_{cr\text{-}cn}$

1 begin
2     Find the crus valley contour $C \leftarrow M \cap P_{cr}$, such that $C(0)$ is closer to $p_T$, and $C$ (end) is closer to $p_A$
3     Find a seed point $S = \arg\min_{p \in C} \| p - p_{cr} \|^2$
4     Find a segment $C_s$ of $C$, such that $C_s(0) = S$ and $C_s$ (end) = $C$ (end)
5     Define a reference tangential direction $T \leftarrow \mathbf{Dir}\ (C(end)\text{-}C(0))$

FIG. 18G

6    Loop through $C_s$ to find the first point $p_1$ whose tangential inner product with $T$ is below certain threshold 7    Find the shortest weighted geodesic $g$ from the $p_c$ to $C_s$, where weights favor convex points, and identify its intersection with $C_s$ as another candidate point $p_2$ 8    $p_{cr\text{-}cn} \leftarrow w_1 p_1 + w_2 p_2$ as a weighted combination 9 end

SYSTEM AND METHOD FOR AUTOMATIC DETECTION OF ANATOMICAL FEATURES ON 3D EAR IMPRESSIONS

CROSS REFERENCE TO RELATED UNITED STATES APPLICATIONS

This application claims priority from "Automatic Detection of Anatomical Features on 3D Ear Impressions", U.S. Provisional Application No. 61/108,569 of Baloch, et al., filed Oct. 27, 2008, the contents of which are herein incorporated by reference in their entirety.

TECHNICAL FIELD

This disclosure is directed to methods of representing the interior surfaces of the external and outer ear.

DISCUSSION OF THE RELATED ART

The understanding and analysis of complex surfaces require certain level of abstraction, where redundant details are eliminated, by more emphasis on the occurrence of rare events and informative features that are distinctive of a shape, yet sufficiently consistent among its realizations. Singularity theory plays a role in this regard, and helps in the identification of geometric and/or topological features as discontinuities of a function defined on the surface. The resulting abstraction captures the essence of the geometry in the form of morphological descriptors that drive surface classification and indexing. In other applications, they are used to guide registration and segmentation algorithms, and to ensure the integrity of the constituent features during surface denoising.

The accuracy of each of aforementioned applications depends on the adequacy of abstraction. The task is challenging due to the variability of shapes for organic surfaces, and it is typically not possible to consistently identify constituent features solely from geometric and topological information. This task, however, may be simplified by incorporating prior knowledge in the form of anatomical features or via anatomical atlases. The scope of such approaches is, however, limited to a particular class of surfaces. Application to other organic shapes requires redefinition of features or to construction of a new atlas.

This disclosure is directed to a particular class of shapes that represents the interior surface of the external and outer human ear. The task is significant in hearing aid manufacturing, and aims at eliminating the tedious manual detailing and modeling procedures. The idea is to develop a set of rules for automating the detailing of ear impressions for constructing hearing aid shells. Hearing aids are generally custom made, designed to fit the ear(s) of a patient with ease and comfort. Ear impressions are first acquired by an audiologist by inserting a mold through an injector deep into the ear canal. The mold is allowed to settle to the interior of the exterior and outer ear, before the impression is removed. The impression is then subject to a 3D digital scan to create a 3D image of the impression. During the detailing and modeling process, an operator manually carries out several modifications on the reconstructed surface as illustrated in FIG. 1, to design the end product: a hearing aid that conveniently fits in the ear with all its associated electronics. Referring to FIG. 1, the top row shows some shell detailing operations, such as, from left to right, canal tapering, and helix modification, while the bottom row shows shell modeling operations, such as vent and electronics placement. The rightmost item on the bottom row corresponds to the final shell.

Despite similar appearances, ear impressions exhibit large amount of biological variability across individuals. In addition, missing data as well as excess material pose challenges to existing registration and segmentation algorithms, which fail to yield the sub-millimeter accuracy required in hearing aid manufacturing. Consequently, most of the manufacturing pipeline still relies on a high level of manual involvement, and is, therefore, in need of automation. Hence, it is useful to automatically identify a set of features that can define rules for surface modification. Although there has been research on biometric feature detection as related to the face and external ear, both in 2D and 3D, the detection of anatomical features on outer ear has been much less investigated.

SUMMARY OF THE INVENTION

Exemplary embodiments of the invention as described herein generally include methods and systems for developing a comprehensive set of anatomical features on a 3D ear impression for shell indexing, and classification, for constructing a canonical morphological descriptor or signature of the human ear, which may be used for fully or semi-automated design of hearing aid shells. This set of anatomical features is inspired by the steps taken by designers while detailing and modeling hearing aids. Since a hearing aid is designed to perfectly fit the ear of a subject, the corresponding detailing rules form a baseline for accurate ear representation. Anatomical features are characterized into more generic topological and geometric features, such as peaks, pits, concavities, elbows, ridges, and bumps, and fast algorithms are constructed for their detection. As a result, the application of the algorithms according to an embodiment of the invention is not limited to ear impressions. For example, an algorithm for tracing the inter-tragal notch (a ridge on the ear canal) may be readily used for tracing a nose in face recognition. The robustness of the algorithms according to embodiments of the invention is validated on a large database of 3D impressions, and a concrete set of experiments are presented that involve classification, segmentation, and automatic detailing to highlight the significance of a signature according to an embodiment of the invention.

According to an aspect of the invention, there is provided a method for detecting anatomical features in 3D ear impressions, the method including receiving a 3D digital image of a 3D ear impression, obtaining a surface of the ear impression from the 3D image, analyzing the surface with one or more feature detectors, the detectors adapted to detecting generic features, including peak features, concavity features, elbow features, ridge features, and bump features, and derived features that depend on generic features or other derived features, and forming a canonical ear signature from results of the detectors, where the canonical ear signature characterizes the 3D ear impression.

According to a further aspect of the invention, detecting a peak feature includes orienting the surface in a local coordinate system, initializing a scanning plane whose normal is parallel to a z-axis of the coordinate system, forming a first level set formed by intersecting the surface with the scanning plane, forming a second level set by intersecting the surface with a scanning plane displaced in the normal direction along the surface, and analyzing the first and second level sets to search for critical points enclosed by the level set, where the existence of a critical point indicates the presence of a peak feature, where peak features of an ear include the canal tip, concha peak, and helix peak.

According to a further aspect of the invention, the method includes, when no critical point was detected, displacing the scanning plane in the normal direction for a new second level set and using the previous second level set as a new first level set, and repeating the step of analyzing the first and second level sets to search for critical points.

According to a further aspect of the invention, analyzing the first and second level sets includes comparing a number of connected components in each level set, where each connected component is a contour, identifying the level set enclosing a greater number of contours as a lower level set, identifying and associating corresponding contours enclosed by the two level sets, and comparing an arc-length of any unassociated contour in the lower level set to a tolerance, where a contour whose arc-length is less than the tolerance encloses a critical point.

According to a further aspect of the invention, detecting a concavity feature includes identifying a region of interest (ROI) contained in the surface, specifying a first and second orthogonal directions along the ROI, scanning the ROI along the first direction to generate a profile of first contours in the ROI, identifying those points on each first contour having a lowest negative curvature, computing a seed point location from an average location of the points having a lowest negative curvature, scanning the ROI along the second direction to generate a profile of second contours, identifying those points on each second contour having a lowest negative curvature, correcting the seed point location by averaging over the locations of the points having a lowest negative curvature on each second contour, and growing a concave regions outward from the seed point, where concavity features of an ear include the tragus center, the anti-tragus center, the crus center, and the anti-helix center.

According to a further aspect of the invention, the method includes repeating steps of scanning the ROI along the first direction, identifying those points on each first contour having a lowest negative curvature, averaging the seed point location over locations of the points, scanning the ROI along the second direction, identifying those points on each second contour having a lowest negative curvature, and averaging the seed point location over the locations of the points, until the seed point location converges.

According to a further aspect of the invention, detecting an elbow feature includes estimating a centerline of the shell surface, constructing a plurality of cross sectional profile contours oriented along the centerline, forming radial contours connecting corresponding points across the set of profile contours, analyzing each radial contour to identify points having a high curvature, discarding those points whose curvature falls below a predefined threshold, and analyzing all point combinations of the remaining point that define a cross sectional plane of the shell, and clustering the points in a generalized Hough space to find a plane that yields a minimal variation as identifying an elbow in the shell, where elbow features of an ear include the first bend and the second bend.

According to a further aspect of the invention, detecting a ridge feature includes finding a starting point and an ending point of a ridge on the surface, and computing a geodesic connecting the starting and ending points that minimizes a cost functional of a curve connecting the starting and ending points weighted by the curvature of each point along the curve, where the ridge is defined by the geodesic, where ridge features of an ear include the intertragal notch, the crus-side canal ridge, and the crus-helix ridge.

According to a further aspect of the invention, detecting a bump feature includes constructing a plurality of cross sectional profile contours along the surface, selecting a contour at one end of the plurality of contours as a reference contour, for each other contour in the plurality of contours, comparing an area of the reference contour with the area of a current contour in the plurality of contours, finding bump points on the current contour, where an area enclosed by the current contour exceeds that of the reference contour by a predetermined threshold, and collecting the bump points into areas by region growing from each bump point, where bump features of an ear include the canal bulbous.

According to a further aspect of the invention, the method includes updating the reference contour with a current contour, where a difference of areas enclosed by the current contour and of the reference contour is less than the predetermined threshold.

According to a further aspect of the invention, finding bump points on the current contour includes projecting points on the current contour onto the plane of the reference contour, finding a closest point on the reference contour for each projected current point, to form a pair of corresponding points, comparing a distance of a projected current point to a projected centroid of the current contour to a distance of the corresponding reference point to a centroid of the reference contour, for each corresponding point pair, and determining that the projected current point is bump if the distance to its centroid is greater than the corresponding distance of the reference contour point by a predetermined threshold.

According to a further aspect of the invention, an area enclosed by a contour is calculated from $$\sum_{j=0}^{|c_p|-1} \text{Area}\Delta_j,$$

where $c_p$ is a contour, $|c_p|$ is a cardinality of a discretized representation of $c_p$, and $\Delta_j$ is a triangle spanned by the centroid $\hat{c}_p$ of the contour $c_p$ and two successive contour points $p_j$ and $p_{j+1}$.

According to a further aspect of the invention, region growing for each bump point includes collecting convex surface points with curvature greater than a predefined threshold.

According to another aspect of the invention, there is provided a method for detecting anatomical features in 3D ear impressions, the method including receiving a 3D digital image of a 3D ear impression, obtaining a surface of the ear impression from the 3D image, scanning a canal region of the surface with horizontal planes to yield a plurality of cross sectional contours, identifying and rejecting outlying contours near a tip of the canal, by comparing the circumference and the position of extremal points on a first principle axis of the outlying contour with the circumference and corresponding extremal point positions on a first principle axis of an inner contour, analyzing the remaining contours for ellipticity, and further analyzing highly elliptical contours to identify potential starting ridge points, finding a pair of starting points from the potential ridge points, finding an ending point at the base of the shell at the center of convexity of a contour connecting the tragus center point and the anti-tragus center point, detecting a ridge between each pair of starting points and the ending point, classifying a shorter ridge as an intertragal notch, and identifying the other starting point as the starting point of a crus-side canal ridge, and detecting a ridge as the shortest of the geodesics from the starting point of a crus-side canal ridge to the each point on the bottom boundary of the shell and identifying this ridge as a crus-side canal ridge.

According to a further aspect of the invention, the method includes detecting a concha center point, a tragus center point, and a ridge in the surface, calculating a weighted geodesic connected the concha center point and the tragus center point, where the geodesic is weighted by a curvature function that is a decreasing function of curvature and that penalizes an optimal geodesic from passing through points on the ridge, and finding an intersection point of the geodesic with the ridge, finding an intersection point of the geodesic with the ridge, where the ridge is one of crus-side canal ridge and the intertragal notch, and the intersection point is one of a canal-concha intersection point and a canal-crus intersection point.

According to a further aspect of the invention, the method includes detecting a helix peak in the surface, finding a contour on the surface that defines a bottom of an opening, initializing an optimal arc-length, and for each point on the contour, finding a weighted geodesic on the surface from the point to the helix peak, where the geodesic is weighted by a curvature function that is a decreasing function of curvature, and calculating an arc-length of the geodesic, where if the geodesic arc-length is less than the optimal arc-length, assigning the geodesic arc-length to the optimal arc-length, where a geodesic with a shortest optimal arc-length is identified as the crus helix ridge of the ear.

According to a further aspect of the invention, the method includes detecting the helix peak point, the concha center point, the crus helix ridge, and the crus-side canal ridge in the surface, finding an unweighted helix-concha geodesic on the surface connecting the helix peak point and the concha center point, finding a crus pivot point as the lowest point on the helix-concha geodesic, finding a weighted pivot-helix bottom geodesic on the surface connecting a first point of the crus helix ridge and the crus pivot point, where the weights favor concave points, finding a weighted pivot-canal bottom geodesic on the surface connecting the crus pivot point and a first point of the crus-side canal ridge, where the weights favor concave points, selecting a seed point in an area enclosed by the pivot-canal bottom geodesic and the pivot-helix bottom geodesic, and growing a region from the seed point bounded by the pivot-canal bottom geodesic and the pivot-helix bottom geodesic, where the area is identified as the crus area.

According to a another aspect of the invention, there is provided a program storage device readable by a computer, tangibly embodying a program of instructions executable by the computer to perform the method steps for detecting anatomical features in 3D ear impressions.

BRIEF DESCRIPTION OF THE DRAWINGS

FIG. 17 depicts Table I, which characterizes anatomical features of the ear, and Table II, which presents means similarity measures of ear features, according to an embodiment of the invention.

FIGS. 18A-G depict Algorithms 1 to 11, according to an embodiment of the invention.

DETAILED DESCRIPTION OF EXEMPLARY EMBODIMENTS

Figure 1:
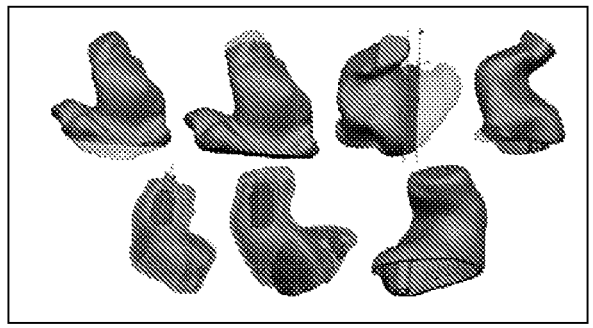
FIG. 1 illustrates exemplary shell detailing and modeling, according to an embodiment of the invention.

Exemplary embodiments of the invention as described herein generally include systems and methods for developing a comprehensive set of anatomical features on a 3D ear impression for constructing a canonical ear signature. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to a surface representation. For example, surfaces commonly acquired in practical settings are represented with point clouds or discrete triangulated meshes. But the scope of embodiments of this invention is not limited to triangulated meshes, and also applies directly to other forms such as polygonal meshes, smooth surfaces represented in any parameterized form, and/or through any variant of splines. The image may also be an implicit representation of a surface, or be a surface embedded in a 3D volume in the form of voxelized data. Typically, the image is acquired through a laser scanner, but CT scan, and/or other variants or other similar or new advanced technologies may be employed.

Comprehensive Set of Anatomical Features

Features of interest can be defined from a set of prominent and distinctive anatomical regions and entities on the external and outer ear. These entities have been found to be stable over a sufficiently large number of human ears, and can uniquely determine the final shape of a hearing aid. It should be noted that a wide range of hearing aid configurations are commonly available, ranging from the largest, In-the-Ear (ITE), to the most discrete, Completely-In-the-Canal (CIC). It is possible that certain configurations may not be possible for certain ears. CIC, for instance, requires relatively long canals to hold electronics. The features may, therefore, also be exploited to determine the buildability of a particular model for a given patient (or individual).

Figure 2:
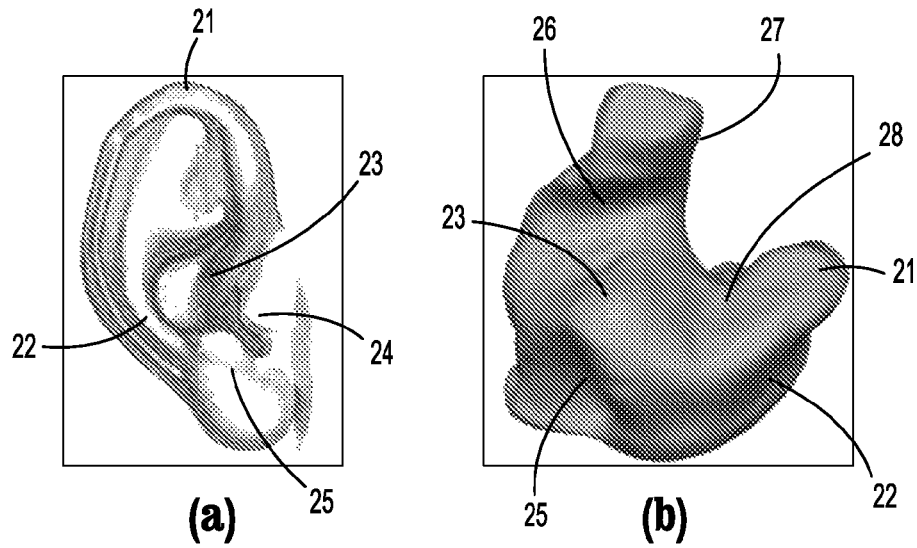
FIGS. 2(a)-(b) illustrate an exemplary human ear, according to an embodiment of the invention.
Figure 3:
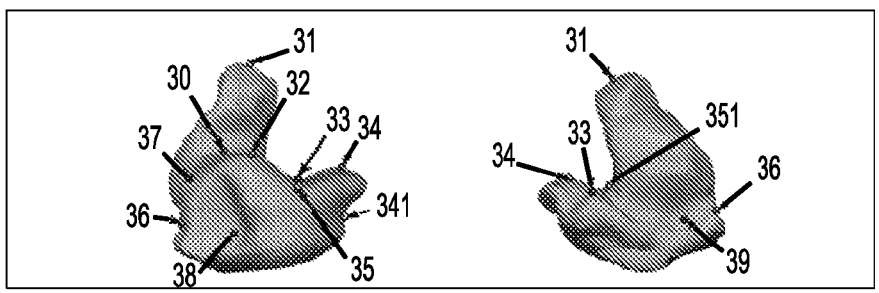
FIG. 3 depicts an exemplary point feature set, according to an embodiment of the invention.

FIG. 2(*a*) depicts a typical human ear and FIG. 2(*b*) depicts a 3D ear impression. Ear features identified in the figure include the helix 21, the anti-helix 22, the concha 23, the tragus 24, the anti-tragus 25, the aperture 26, the canal 27, and the crus 28. A typical ear impression is characterized by a long and narrow spindle shaped canal that sits deep in the outer ear and a base or shell body that resides in the external ear, where the two are separated by a narrow visible opening in the ear commonly known as the canal aperture. A typical hearing aid is held in place like clamps by two regions along the bottom of the ear, referred to as Tragus and Anti-Tragus, seen in FIG. 2. Their accurate detection avoids shell modifications in these regions and ensures that the ear firmly grips the hearing aid. In certain configurations, the tragus area is scooped to enhance this grip. In addition, the relative position of these two features helps determine the side of the shell. On the top, shell is held by the narrow Helix sandwiched between the Anti-Helix and the protruded Crus. On the other hand, the so-called Concha offers a relatively large bowl area to hold bulky electronics in most shell configurations. According to an embodiment of the invention, a set of anatomical features can be defined that define the anatomy of a shell, in addition to playing a role in the shell shaping process. These features are shown in FIGS. 3 through 6 and are listed below:

Point Features, shown in FIG. 3, are: canal tip 31, concha center 32, helix peak 34, center of anti-helix 341, center of tragus 39, center of anti-tragus 38, center of crus 33, inter-tragal notch flare 36, center low aperture 30, crus-concha intersection 35, crus-canal intersection 351, and canal concha intersection 37.

Figure 4:
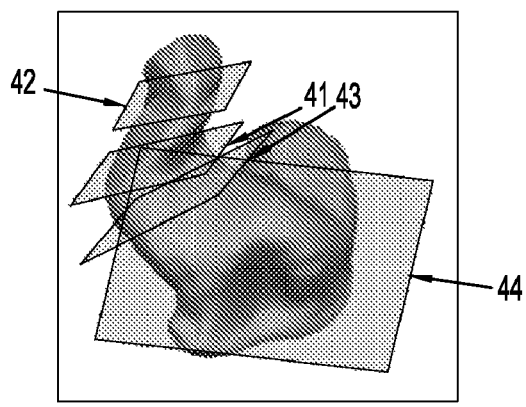
FIG. 4 depicts an exemplary plane feature set, according to an embodiment of the invention.

Plane Features, shown in FIG. 4, are: first bend plane 41, second bend plane 42, aperture plane 43, bottom cut flare plane 44.

Figure 5:
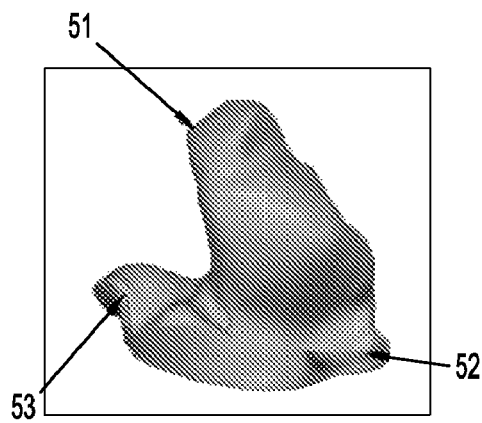
FIG. 5 depicts an exemplary curve feature set, according to an embodiment of the invention.

Curve Features, shown in FIG. 5, are: inter-tragal notch 52, crus-side canal ridge 51, crus-helix ridge 53.

Figure 6:
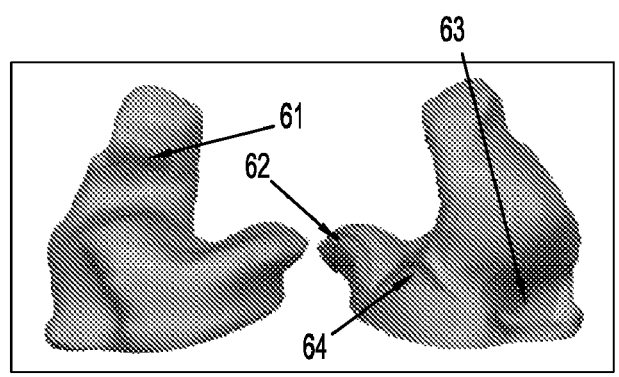
FIG. 6 depicts an exemplary area feature set, according to an embodiment of the invention.

Area Features, shown in FIG. 6, are: tragus area 63, crus area 64, helix ridge area 62, canal bulbous 61.

Generic Feature Detection

An approach according to an embodiment of the invention to detecting anatomical features is based on generalization, where various anatomical features are characterized according to a reduced set of generic features, namely peaks $\{F_p\}$, concavities $\{F_c\}$, elbows $\{F_e\}$, ridges $\{F_r\}$, and bumps $\{F_b\}$. Although some anatomical features may not be represented by these geometric primitives, they may still be derived from the latter. According to embodiments of the invention, algorithms are constructed for the generic features, thereby later providing a foundation for the derived features. These generic algorithms may also be readily applied to other applications, such as biometrics, and reverse engineering, without compromising on the complexity of the derived features. The relationship between generic features and anatomical features is tabulated in Table I, shown in FIG. 17. Reference to the table indicates that a peak detector can be used to detect the canal tip, concha peak and helix peak; a concavity detector can be used to detect the center of tragus, the center of anti-tragus, the center of anti-helix, and the center of crus; an elbow detector can be used to detect the first bend and second bend; a ridge detector can be used to detect the inter-tragal notch, crus side canal ridge, and crus-helix ridge; and a bump detector can be used to detect the canal bulbous. Other features may be detected by a combination of generic feature detectors. For example, the crus-canal and canal-concha intersection points may be found as intersection between the some generic features; the bottom cut flare plane may be defined by three generic features, tragus, anti-tragus, and antihelix; and the helix-ridge area is a band around the crus-helix ridge. Detection of the inter-tragal notch is described in greater detail below. From these features, a canonical ear signature can be defined as the set of all ear features, which is a distinctive signature of an ear.

Let M be a 2-dimensional manifold representing a 3D ear impression embedded in $R^3$ locally parameterized as $\phi: \Omega \rightarrow M$, where an open connected set $\Omega \subset R^2$ represents the parameter space. The task is to detect a set of generic features $F = \{F_r, F_c, F_e, F_r, F_b\}$. In the context of current discussion, M represents the "image" defined above.

The basic idea for generic feature detection comes from Morse theory, and involves defining a smooth real valued function $f: M \rightarrow R$ on a surface M to abstract its shape though its critical points. A point $p = \phi(u) \in M$, $u \in \Omega$ is a critical point of $f$ if the gradient of $f \circ \phi$ vanishes at u, i.e., $\nabla f \circ \phi(u) = 0$. A critical point $p \in M$ is regarded as non-degenerate if the Hessian $\nabla^2 f \circ \phi(u)$ is nonsingular at $\phi(u)$. Non-degenerate critical points are stable and, therefore, ideal for capturing the topology of a surface. A smooth function is called Morse if all of its critical points are non-degenerate. For a Morse function defined on a closed surface, these critical points correspond to the maxima, the minima, and the saddle points of the function, and represent the global structure of the surface. The task is then to define a suitable function for surface analysis. Two functions of particular interest are a height function, h, and a curvature function, $\kappa$.

Peak Detection

A peak point, a maximal critical point, is one of the prominent topological landmarks on a surface that may be detected through a specific Morse function. According to an embodiment of the invention, the critical points of a height function are of interest. A height function may be defined as follows.

Given a surface M embedded in $R^3$, with the height aligned along the z-direction, a height function h: $M \rightarrow R$ assigns to each point $p(x, y, z) \in M$ a value equal to its height, $h(p) := h(x, y, z) = z$.

For a non-degenerate surface, h is a Morse function and its critical points are the peaks (maxima), passes (saddle points) and the pits (minima) of the surface. The height function can be used for shape abstraction by determining relationships among its critical points. According to an embodiment of the invention, one searches for peaks in a height function by searching for critical points in the height function. An algorithm according to an embodiment of the invention for searching for peaks is presented in Algorithm 1, presented in FIG. 18A. Referring to Algorithm 1, given a shell surface extracted from a digital image of a 3D ear impression, a resolution, a maximum height, and a tolerance as inputs, a peak detection algorithm begins by orienting the shell surface in a local coordinate system at step 2, finding a scanning plane normal vector that is parallel to the z-axis at step 3, and searching for the critical points at step 4. An algorithm according to an embodiment of the invention for searching for critical points is presented in Algorithm 2, presented in FIGS. 18B-C.

Without loss of generality, it can be assumed in an embodiment of the invention that there exists a single critical point of a surface M between h=0 and h=H. An algorithm according to an embodiment of the invention for detecting the critical points of $f$ follows directly from the Morse deformation lemma, which states that a change in the topology of a level set of a Morse function occurs only at its critical level, where a critical level is defined as a level set of a function that contains a critical point. Thus, analyzing the level sets of the height function can identify a level where a change of topology occurs. A surface is, therefore, scanned by way of level sets of the height function, i.e., horizontal planes as detailed in Algorithm 2 and shown in FIG. 7.

Figure 7:
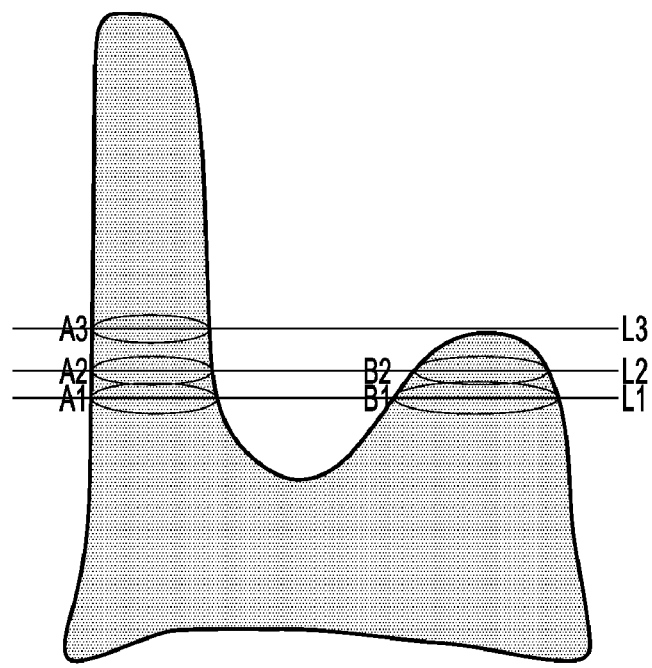
FIG. 7 illustrates peak detection, according to an embodiment of the invention.

Referring now to Algorithm 2, given a shell surface, starting height, ending height, scanning normal, resolution K, and tolerance, an algorithm starts at step 2 by computing a step size form the starting height, ending height, and resolution parameter K, and initializing a previous scanning plane and a previous level set at steps 3 and 4. At step 5, the value of the height function is gradually increased in value in K steps from 0 to H. A current plane at height h∈[0, H] is found at step 6, and the current level set is found from the intersection of the current plane and the input surface with the corresponding planes is found at step 7. The current level set is subsequently analyzed at step 8 for changes in topology between two successive planes. A change in topology may be determined from a change in the number of connected components, i.e. contours, in the level sets. FIG. 7 illustrates peak detection, according to an embodiment of the invention. Referring to the figure, there is a change in topology going from level set L2 to level set L3, as the number contours decreases from 2 to 1. If a change in topology is detected, a critical level exists between them. The number of contours enclosed by the current level set is compared with the number of contours enclosed by the previous level set at step 9, to identify the level set enclosing more contours. Referring to FIG. 7, this level set may be referred to as a lower level set. Corresponding contours enclosed by the two level sets are identified and associated and the arc-length of any unassociated contour remaining in the lower level set is compared to the tolerance. For example, referring to FIG. 7, contour A1 corresponds to contour B1, and contour A2 corresponds to contour B2. According to an embodiment of the invention, an exemplary, non-limiting method of finding the unassociated contours is presented in steps 10-20 of Algorithm 2. The lower level set is identified and named $L_b$ in steps 10-15, and at step 16, the contours of $L_b$ are assigned to a list. Then, at steps 17-19, each contour in the list is associated with a contour enclosed by the other level set that encloses fewer contours, and removed from the list. The remaining contours in the list are then tested for their arc-length at step 21. In the example of FIG. 3, the remaining contour would be B2. If the arc-length is less than the tolerance, it's center point is identified as a critical point at step 22 and returned at step 23. Otherwise, the unassociated contours are recursively searched for the critical point from step 25, where the search is limited to between the previous scanning plane and the current scanning plane with a higher (effective) resolution. Again referring to FIG. 7, one would search for a scanning plane between L2 and L3 that would just graze, within the prescribed tolerance. This process is repeated until convergence to a critical point.

Concavities

Figure 20:
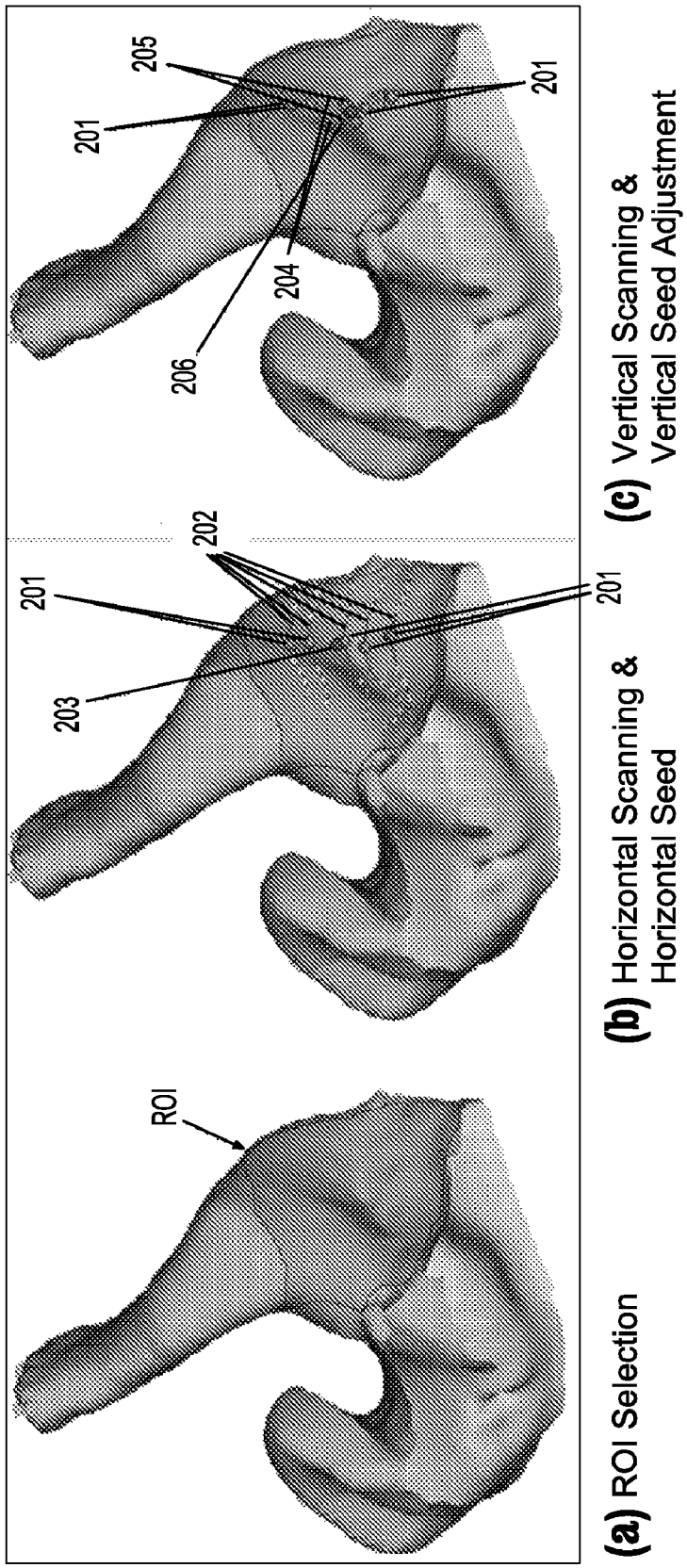
FIGS. 20(a)-(c) illustrate concavity detection, according to an embodiment of the invention.

Concavities are marked depressions on a surface. Their identification is a task of general interest in computer vision, and computer aided design. According to an embodiment of the invention, a general method for concavity detection is presented in Algorithm 3, depicted in FIG. 18A and illustrated in FIGS. 20(a)-(c), and involves orthogonal scans along a surface to generate a contour based surface profile that is subsequently replaced with spline representations. A method according to an embodiment of the invention is robust to noise and executes relatively quickly, given that a typical discretized surface may consist of tens of thousands of vertices. Individual contours are analyzed for variations in curvature. Of particular interest are the points of low curvature, where curvature is assigned a sign based on surface concavity in order to ensure that concavities lead to negative curvature. Referring to FIGS. 20(b)-(c), low negative curvature (high absolute curvature) points are indicated by reference numbers 201. Negative curvature can be defined as the curvature at those points that do not satisfy a convexity condition.

Referring now to Algorithm 3, given a shell surface extracted from a digital image of a 3D ear impression as input, a region of interest (ROI), shown in FIG. 20(a), is identified at step 2, and a pair of orthogonal directions is identified in the ROI at step 3. Then, at step 4, a profile in one orthogonal direction is considered, and subsections of contours 202 (see FIGS. 20(b)-(c)) are identified that have negative curvature at step 6. According to an embodiment of the invention, the contours identified along the orthogonal profile are fitted with splines at step 5. For these subsections, the points of lowest curvature are identified, indicated by reference numbers 201 in FIGS. 20(b)-(c), and their average location is computed as a seed point location, indicated by reference numbers 203 in FIGS. 20(b)-(c), at step 7. This seed point is corrected at step 8 by considering a profile 204 (see FIG. 20(c)) in the other orthogonal direction, finding points of lowest negative curvature 205 and averaging their location for the new position of the seed point 206, again shifting towards the lowest curvature point. Consequently, the seed point is pushed deeper into a valley. The process may be repeated iteratively until the seed point location converges, alternating between the two orthogonal directions, at step 9, to achieve an absolute local minimum. The corrected seed point, therefore, corresponds to the center of concavity. The spline interpolation ensures that the existence of bumps within a concavity does not adversely affect the center detection. Once the concavity is identified, a region growing based on negative curvature may be employed at step 10 to determine the concave region.

Elbows

The detection of elbows can be challenging. First, the computation of a plane only from areas of high curvature on a somewhat tubular surface is nontrivial. Second, the presence of noise and bumps in organic shapes adds further challenges. An elbow detection method according to an embodiment of the invention relies on the identification of high curvature points on a surface followed by a point selection/rejection strategy to fit a plane along the elbow. The plane is eventually realigned with the skeletal representation. This leads to a robust algorithm when compared with computations based solely on the skeleton.

An elbow detection method according to an embodiment of the invention is presented in Algorithm 4, depicted in FIG. 18C. Referring to Algorithm 4, an algorithm for detecting elbows takes as input a predefined region of interest (ROI) $M_r \subset M$ on a shell surface M, the shell surface extracted from a digital image of a 3D ear impression, and estimates at step 2 a centerline of $M_r$. Existing methods, such as harmonic skeletonization, or Reeb graph, yield a reasonably good estimation of the centerline. At step 3, the surface is scanned with planes along the centerline at step to generate a cross-sectional profile contours $\{c_p\}=\{M\cap P_t, \forall t\in[0,1]\}$.

Figure 8:
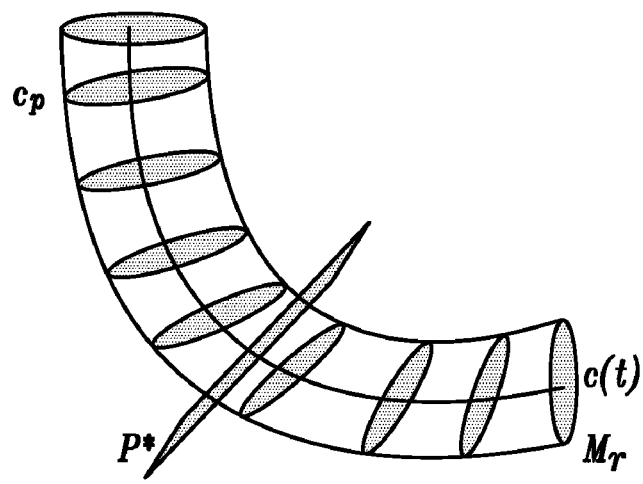
FIG. 8 illustrates elbow detection, according to an embodiment of the invention.
Figure 9:
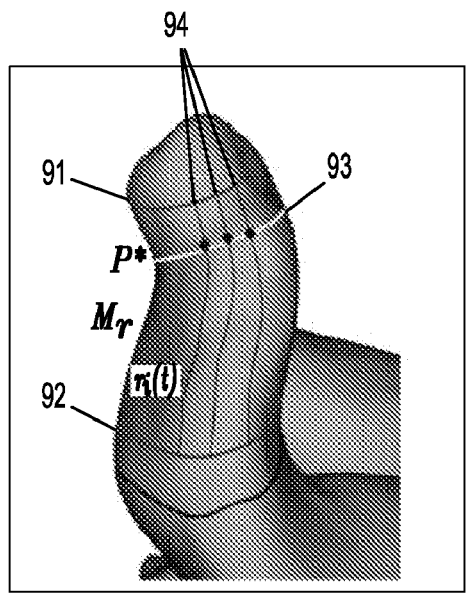
FIG. 9 illustrates correspondences between contours in elbow detection, according to an embodiment of the invention.

A schematic illustration of elbow detection is presented in FIG. 8, which shows surface M with planes $P_t$ oriented along the centerline $c_p(t):t\in[0,1]$ and the cross-sectional profile $\{c_p\}=\{M\cap P_t, \forall t\in[0,1]\}$. The profile contours capture information about bends present on the surface. Referring again to Algorithm 4, correspondences may be established at step 4 between these profile contours along the radial direction, as shown in FIG. 9. Referring to FIG. 9, two planes 91, 92 define the region of interest $M_r$ in the computation of an elbow 93. Referring again to Algorithm 4, at step 5, each radial contour is represented by its spline parameterization $r_i(t)$, indicated by the radial lines 94 in FIG. 9. The spline parameterization achieves robustness to noise as bends correspond to high curvature points along these contours, and scanned contours may not yield reliable curvature estimates. Once radial contours are parameterized, one may at step 6 identify points $q_i$ of maximal curvature along these contours. Let $Q=\{q_i\}$ denote the set of points of maximal curvature for each contour. Note that not all points reliably represent an elbow. While the effect of noise has been eliminated to an extent through spline representation, bumps may still adversely influence plane detection. The set Q is, hence, pruned to increase the robustness of the subsequent plane fitting. Referring again to Algorithm 4, at step 7, all $q_i$ with curvature below a threshold $t_c$ are discarded, to obtain a reduced set Q'. The threshold $t_c$, therefore, determines the sensitivity of the detection algorithm, and the resulting bend is consequently regarded as a $t_c$-sensitive elbow. Next, at step 8, all possible planar combinations of points in different radial contours in the reduced set Q' are considered as defining candidate elbow planes. A generalized Hough transform is employed at step 9 to map the candidate planes in the Hough Space. The bend plane P* is finally found at step 10 from the clustering of the mapped points in the Hough Space.

Ridge Detection

A ridge $r:[0,1] \to R^3 \cap M$ may be defined as a geodesic on a surface M that is characterized by points of high curvature. In order to compute the ridge, it is, therefore, necessary to define a curvature function $\kappa:M \to R$ on the surface and then identify its local extrema. Note that local extrema alone are not sufficient for ridge detection, since several isolated points or pointed areas may also exhibit high curvature due to noise inherent to 3D scanning. Moreover, it is sometimes required to identify a ridge in addition to detecting it, where it is undesirable to detect all possible ridges on a surface. A ridge finding method according to an embodiment of the invention is presented in Algorithm 5, shown in FIG. 18C. Referring to the algorithm, given a shell surface M extracted from a digital image of a 3D ear impression as input, a ridge finding method first detects at step 2 the starting and ending points $p_s$ and $p_e$ respectively, using either geometric information, a priori knowledge, or input from a user, which reduces to a semi-automatic ridge detection.

Once these points are specified, a geodesic that connects the two points is calculated at step 3. An algorithm according to an embodiment of the invention seeks a geodesic that minimizes the cost of going from $p_s$ to $p_e$, where the cost is defined as a weighted combination of the geodesic distance and surface curvature:

$$C(g) = \int_{p_s}^{p_e} w(g(t)) \dot{g}(t) dt, \quad (1)$$

where $g(0)=p_s$, $g(1)=p_e$, and $w: M \mapsto \mathbb{R}$ is a curvature based weighting functional $w(p), \forall p \in M$, and can be of the following form $w(p) = f(\kappa(p))$, where $f$ is a decreasing function of curvature. Hence, the ridge is a minimizer of C:

$$r = \min_{\substack{g \subset M \\ g(0)=p_s, g(1)=p_e}} C(g), \quad (2)$$

and may be easily computed at step 4 for a triangulated mesh, using Dijkstra's algorithm with curvature weighted edge lengths.

Bumps

A bump is a bulge on a surface characterized by hills with gentle slope, instead of pointy high curvature areas. This disclosure focuses on bumps on somewhat tubular surfaces or subsurfaces. A bump detection method according to an embodiment of the invention analyzes surface cross sections and identifies cross sectional areas that exceed a reference area by a pre-defined criterion. These areas are then clustered, according to their connectivity. This leads to a robust algorithm that is capable of detecting multiple unconnected bumps.

A bump finding method according to an embodiment of the invention is presented in Algorithm 6, shown in FIG. 18D. Referring now to Algorithm 6, given a tubular surface, such as the canal, extracted from a digital image of a 3D ear impression as input, the surface is analyzed at step 2 via cross-sectional scans in the region of interest to generate a set of profile contours $\{c_p\}$. The detection task is, hence, reduced to (1) identifying the contours that correspond to a bump, followed by (2) determining the points on these contours that fall on the bump.

Next, at step 3, a reference contour $c_r$ is defined with which all profile contours are compared, starting at one end of $M_r$ and gradually moving towards the other end. Typically, the region of interest $M_r$ is defined so that boundary of $M_r$ does not fall on a bump, making it safe to select the cross-sectional contour at a boundary as the initial reference contour. The reference contour is later continuously updated at step 8 with the last contour found without a bump.

For the identification of bump contours, the area of the each contour $c_p$ is compared to the area of the reference contour at step 4. If the area of the current contour $c_p$ exceeds the reference area by a certain threshold $t_p$, $c_p$ is considered to be along a bump. Note that the computation of the area enclosed by an unparameterized contour may be nontrivial. The following relationship for the area of $c_p$, however, offers a trade-off between computational speed and accuracy:

$$A(c_p) \approx \int d(c_p(t), \hat{c}_p) dt \approx \sum_{j=0}^{|c_p|-1} \text{Area}\Delta_j, \quad (3)$$

where $\hat{c}_p$ is the centroid of $c_p$, $|c_p|$ is the cardinality of a discretized representation of $c_p$, and $\Delta_j$ is the triangle spanned by the centroid $\hat{c}_p$ and two successive contour points $p_j$ and $p_{j+1}$. The relationship is exact only if the centroid is visible from all points of $\hat{c}_p$ but still offers a good approximation in most cases, such as canal impressions.

Figure 10:
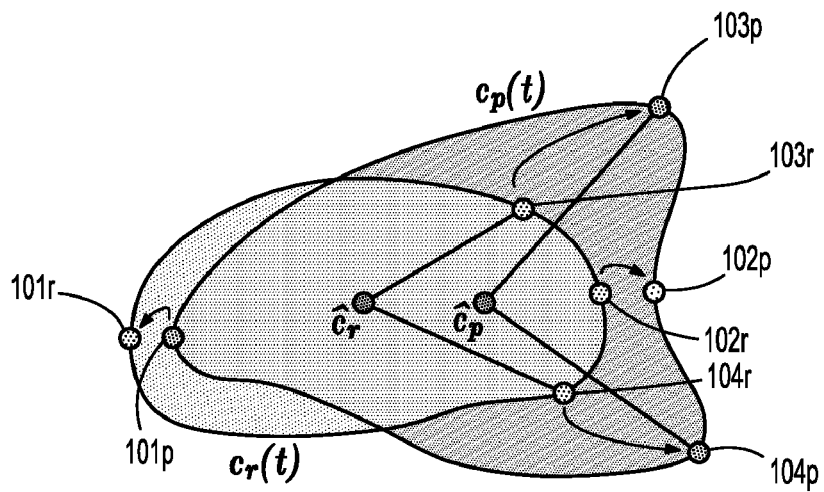
FIG. 10 illustrates the correspondence between a contour $c_p$ and the reference contour $c_r$ during bump detection, according to an embodiment of the invention.

FIG. 10 illustrates the correspondence between a contour $c_p$ and the reference contour $c_r$. Corresponding points 101p, 101r, 102p, 102r, 103p, 103r, 104p, 104r, are then compared by way of their distances from individual centroids $\hat{c}_p$, $\hat{c}_r$. A point on $c_p$ is said to fall on a bump if its distance to $\hat{c}_p$ exceeds the distance between the corresponding reference point $\hat{c}_r$. Points 101p, 103p, and 104p are, therefore, on a bump but not point 102p.

Once a contour is identified with a bump region, a next step 5 is determining its bumpy part. An algorithm according to an embodiment of the invention for finding a bulbous part is presented in Algorithm 7, shown in FIG. 18D. Referring to Algorithm 7, given a bump contour and a reference contour as input, the bump contour is projected to the plane of the reference contour at step 2. In this two-dimensional subspace of the reference plane, a correspondence is found at step 3 between the projected points and the reference contour. Corresponding points are then compared by way of their distances from the respective centroids at step 4. If the distance of a projected point to the centroid of $c_p$, $\hat{c}_p$, exceeds the distance of the corresponding reference point to the reference centroid, $\hat{c}_r$, the point is marked a bump point at step 5. Such a criterion takes into account possible shifts of the centroids and provides accurate estimates for bulbous points.

Referring again to Algorithm 6, the bump points found on a bump contour are added to a list of all bump points at step 6, and after all contours are examined, the bump points serve as seed points for a region growing performed at step 11 to form areas of connected points. A region growing according to an embodiment of the invention starts at each bump point and recursively searches for bump points of the one ring neighborhood of the current bump point, and adds them to a bump region if a curvature associated with each point is greater than a threshold.

Anatomical Features Detection

Figure 22:
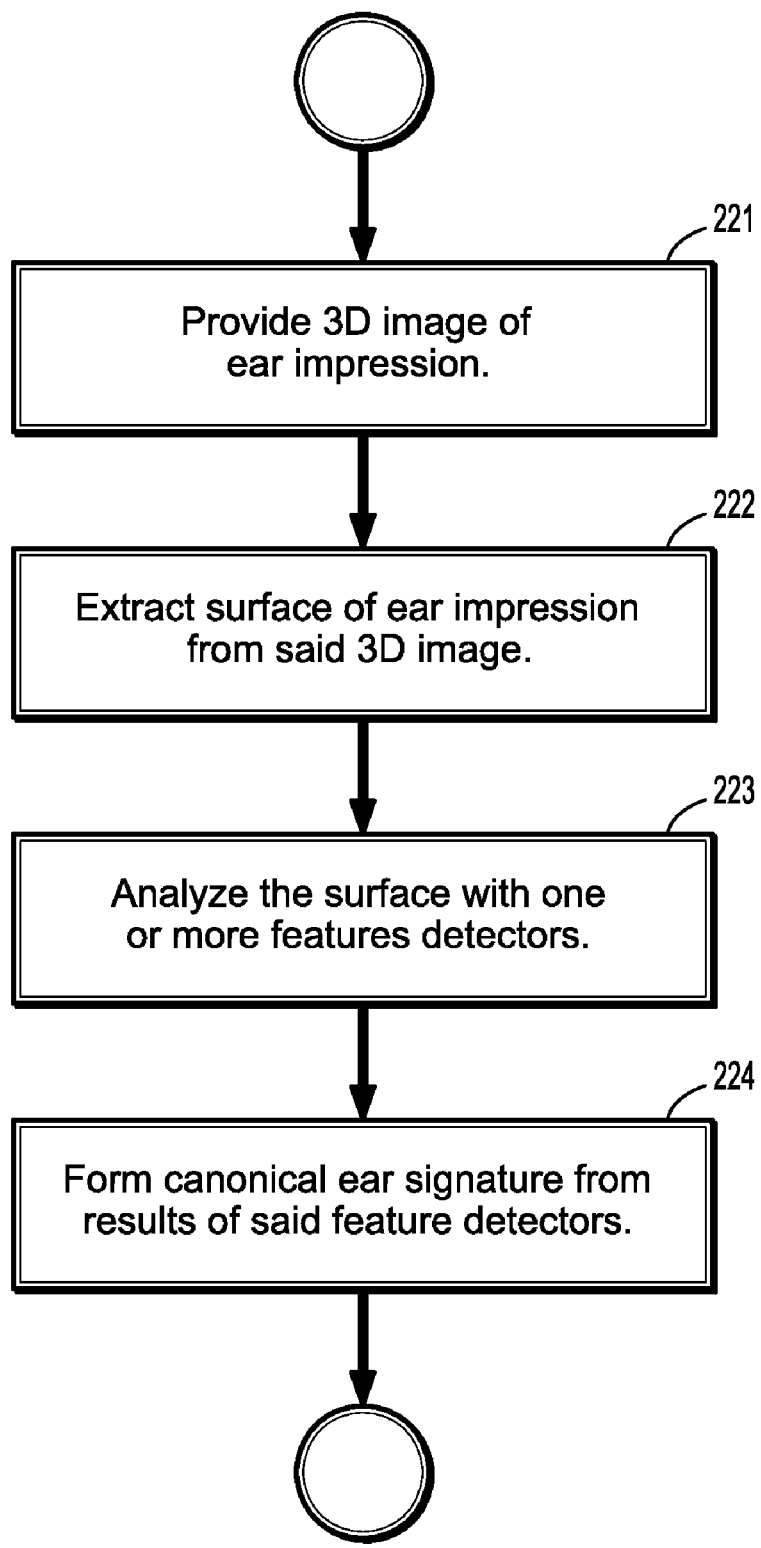
FIG. 22 is a flow chart of a method for detecting anatomical features in 3D ear impressions, according to an embodiment of the invention.

An algorithm according to an embodiment of the invention can now detect the canonical anatomical features on 3D ear impressions. The aforementioned algorithms for generic algorithms are modified for the ear descriptor application under consideration. A flowchart of a method for detecting features in 3D ear impressions is presented in FIG. 22. Referring now to the figure, a method begins at step 221 by providing a 3D digital image or point cloud from a digital scan of a 3D ear impression. At step 222, a surface of said ear impression is extracted or reconstructed from said 3D image, and at step 223, said surface is analyzed with one or more features detectors that detect generic features, and features derived from the generic features. The results of these feature detectors are used at step 224 to from a canonical ear signature that characterizes the 3D ear impression.

Generic Features

Intertragal Notch, and Crus Side Canal Ridge

For example, for the inter-tragal notch and the crus-side ridge, one first needs to detect the end points of the corresponding ridges. According to an embodiment of the invention, one scans the canal area with horizontal planes. The resulting profile contours are analyzed for their ellipticity. If the contours turn out to be highly elliptical, a principal component analysis (PCA) of the contours yields a good estimate of the ridge points. Otherwise, high curvature points on their spline representation are utilized. PCA is preferred over the use of high curvature points, since PCA is more robust than the latter. In addition, an ear canal is typically quite noisy near its tip. An algorithm according to an embodiment of the invention rejects outlying contours. If a contour is an outlier, its circumference and the position of maximal points on the first principle axis will be quite different from those of inner contours, and can be used to identify the outlier. Eventually, two points are found on the two ridges on the canal, one for the inter-tragal notch, the other for the crus-side canal ridge. One still needs to identify which is on the notch side. The bottom of the inter-tragal notch is detected by considering the convexity of the bottom contour between tragus and antitragus. Geodesics are run from the ridge tops to the bottom point using a ridge detection algorithm according to an embodiment of the invention. The shorter geodesic is classified as the inter-tragal notch. The other ridge top is considered the crus-side ridge top, and a corresponding geodesic from this point to the bottom contour is the crus-side canal ridge.

Crus Helix Ridge

Crus helix ridge is a generic feature and its detection requires finding its starting and ending points. The helix peak point is used as the starting point and the ending point and the subsequent geodesic are found according to an embodiment of the invention as given in Algorithm 9, presented in FIG. 18E. Referring to Algorithm 9, given a shell surface and a helix peak point as inputs, a Crus helix ridge detection algorithm begins at step 2 by finding a contour B that defines the opening at the bottom of the shell. At step 3, a weight function is defined that is a decreasing function of curvature that favors convex points. The arc length of an optimal ridge is initialized at step 4. Then for each point in the contour, a weighted geodesic is found on the shell surface at step 6, using the helix peak point and the contour point as end points, and the weighting function. The arc-length of the geodesic is found at step 7, and, at step 8, if it is less than the initialized length, the arc-length is updated with the geodesic arc-length and the crus helix ridge is updated to be the geodesic at steps 9 and 10. After considering all points on the contour, the shortest geodesic is returned as the crus helix ridge.

Bulbous Area and Second Bend Plane

For detecting bulbous areas and first and second bends, canal was selected as the region of interest.

Derived Features

Center Low Aperture

The center low aperture, reference number 30 in FIG. 3, is a derived feature and depends on the aperture plane. The profile contour of the shell at the aperture is found from the intersection of the shell with the aperture plane and its principal component decomposition is carried out. The aperture contour is then projected onto the second principal axis to find the two points that have extremal projections. The extremal point which is closest to the center of concha point is the center low aperture.

Canal-Crus and Canal-Concha Intersection

The canal-concha (or canal-crus) intersection is detected as an intersection of two geodesics, the primary and the secondary geodesics. The primary geodesic is one of the generic features, such as the crus-side canal ridge (or the intertragal notch), while the secondary geodesic is traced from the two generic features points. An algorithm according to an embodiment of the invention for finding the canal-concha/canal-crus intersection is presented in Algorithm 8, depicted in FIG. 18E.

For finding the secondary geodesic, a special form of the weight functional of EQ. (2) is used:

$$w(p) = \begin{cases} \infty, & \text{if } p \in \alpha \\ f(\kappa(p)), & \text{otherwise} \end{cases} \quad (4)$$

where $\alpha \in M$ is a set of points on the surface, and $f(\kappa(p))$ is a decreasing functional of curvature. This particular weighting functional penalizes the optimal geodesic from passing through points in $\alpha$, and favors its passing through points of high curvature.

With $p_s$ and $p_e$ defined earlier, one can make the following selections:

For canal-concha intersection, $\alpha$=the crus-side canal ridge, $p_s$=center of concha, $p_e$=center of tragus.

For canal-crus intersection, $\alpha$=the intertragal notch, $p_s$=center of concha, $p_e$=center of tragus.

Referring to Algorithm 8, with this selection, EQ. (2) may be solved at step 2 to find the secondary geodesic g. The canal-concha intersection (or canal-crus intersection) is found at step 3 from the intersection between g and the inter-tragal notch (or crus-side canal ridge).

Helix Ridge Area

The helix ridge area is derived from the crus helix ridge and its detection involves the selection of a band of width D on the shell surface around the helix ridge.

Crus Area

The crus area is derived from the helix peak point, the concha center point, the crus side canal ridge, and the crus helix ridge. A corresponding algorithm according to an embodiment of the invention is given in Algorithm 10, presented in FIG. 18F. Referring to Algorithm 10, given shell surface, the helix peak point, the concha center point, the crus helix ridge, and the crus-side canal ridge as inputs, an algorithm begins at step 2 by defining a weight function that is a decreasing function of curvature that favors to concave points. At step 3, an unweighted geodesic is found on the shell surface using the helix peak and the concha center as end points. The crus pivot point is found from the lowest point on the unweighted geodesic at step 4. At step 5, a weighted geodesic is found on the shell surface using the crus pivot point and the bottom of the crus helix ridge as end points, and using the weight function. This geodesic is referred to as a pivot-helix bottom geodesic. At step 6, a weighted geodesic is found on the shell surface using the crus pivot point and the bottom of the crus-side canal ridge as end points, and using the weight function. This geodesic is referred to as a pivot-canal bottom geodesic. The boundary of the crus area is defined at step 7 from the pivot-helix bottom geodesic and the pivot-canal bottom geodesic. A seed point is selected at step 8 in the region enclosed by the boundary, and a region is grown from the seed point at step 9, using the boundaries as constraints.

Crus-Concha Intersection

Figure 21:
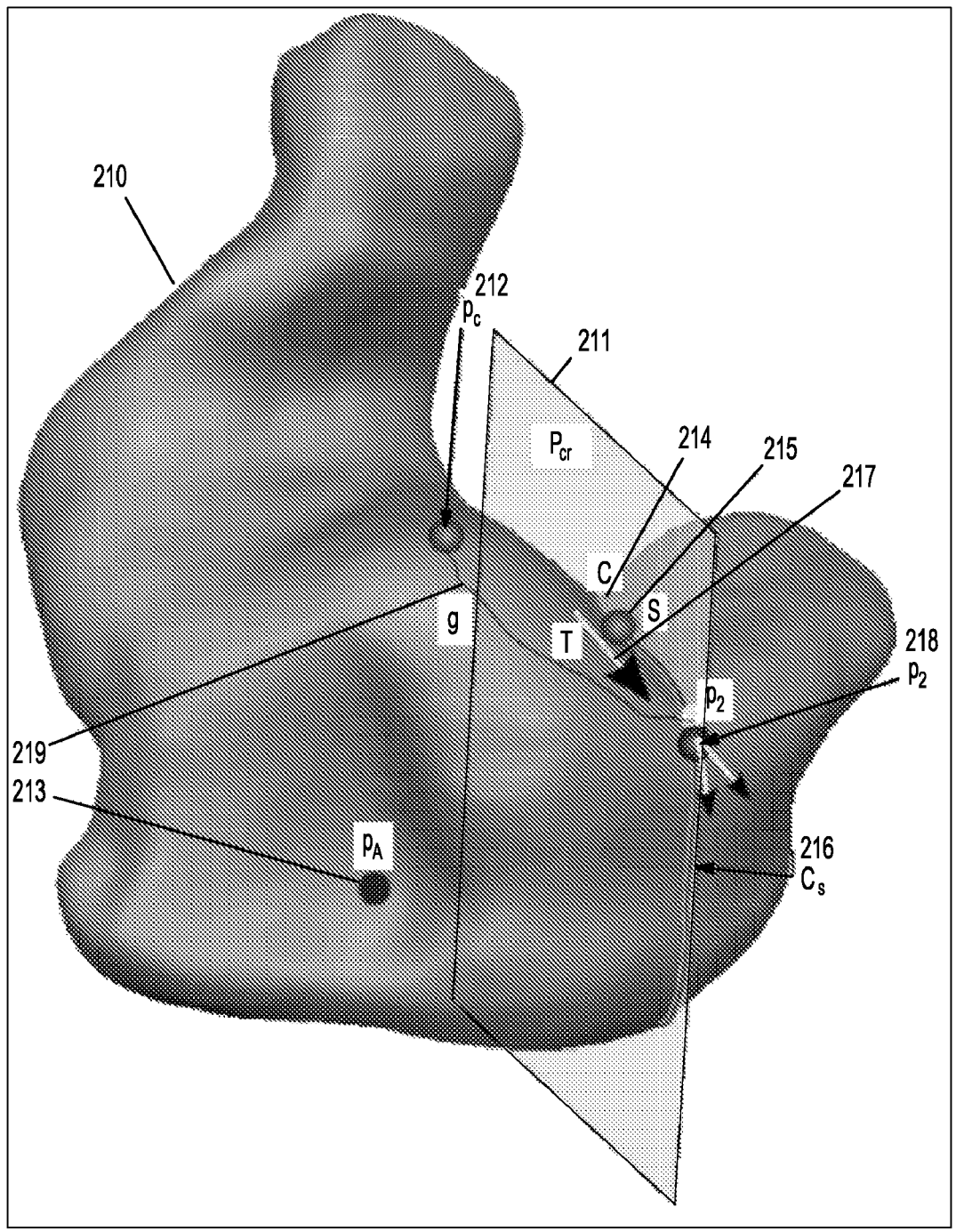
FIG. 21 illustrates finding the crus-concha intersection, according to an embodiment of the invention.

The detection of the crus concha intersection depends on the crus valley plane, centers of tragus, anti-tragus, crus, and concha points. An algorithm according to an embodiment of the invention is given in Algorithm 11, presented in FIGS. 18F-G, and is illustrated in FIG. 21. Referring to Algorithm 11 and FIG. 21, given a shell surface 210, the crus center point, the crus valley plane 211, the concha center point 212, the tragus center point, and the anti-tragus center point 213 as inputs, an algorithm begins at step 2 by finding the crus valley contour 214 from an intersection of the shell surface and the crus valley plane such that beginning point of the contour is closer to the tragus center point, and the end point of the contour is closer to the anti-tragus center point. A seed point 215 is found at step 3 as a point on the contour having a minimal distance to the crus center point. At step 4, a contour segment 216 from the seed to the contour end point is found, and a reference tangential direction 217 is determined at step 5 from the direction of a vector extending from the contour starting point to the contour end point. At step 6, a first point is found on the contour segment 216 whose inner product with the tangential direction 217 is below a predetermined threshold. At step 7, a second point 218 is found from the intersection of contour segment 216 with a shortest weighted geodesic 219 from the concha center point 212 to the contour segment 216. The crus concha intersection point is found at step 8 from a weighted average of the first and second points.

Figure 11:
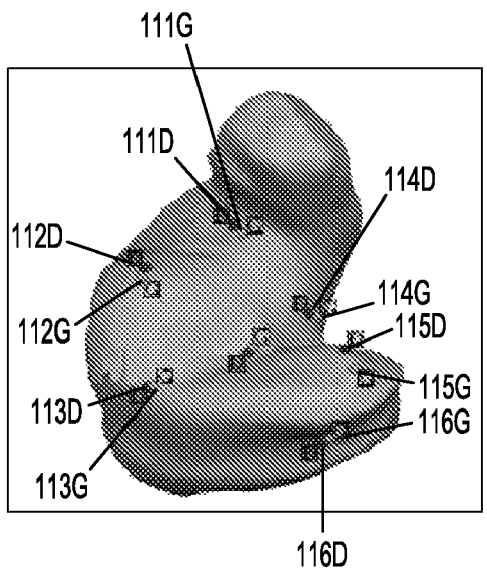
FIG. 11 compares automatic detection versus ground truth, according to an embodiment of the invention.
Figure 12:
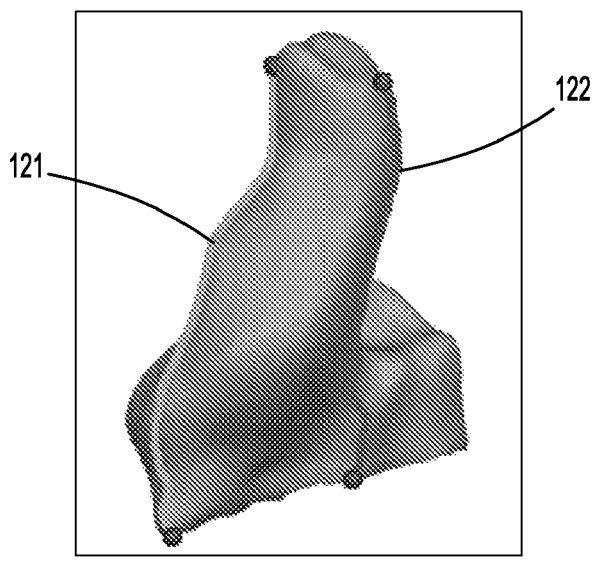
FIG. 12 illustrates the automatic detection of the inter-tragal notch and the crus-side canal ridge, according to an embodiment of the invention.

Some of the detected point features are compared with the ground truth in FIGS. 11 and 12, which demonstrates the accuracy of an algorithm according to an embodiment of the invention. FIG. 11 compares automatic detection with ground truth, showing the center low aperture 111D, 111G, the concha point 112D, 112G, the crus-concha intersection 113D, 113G, the canal-crus intersection 114D, 114G, the helix peak 115D, 115G, and the anti-helix 116D, 116G, where points labeled G represents ground truth, while points labeled D represent detected features. FIG. 12 illustrates an automatically detected inter-tragal notch 121 and the crus-side canal ridge 122.

Experiments

Validation of an algorithm according to an embodiment of the invention was carried with two mutually exclusive datasets, $D_t$ and $D_T$. First, various algorithm parameters were tuned with $D_t$. The second data set $D_T$ was batch processed to generate a list of computed features. In addition, an expert was asked to independently manually mark the features under consideration on $D_T$ to be used as ground truth, before comparing the two sets of results.

Different measures are used for the validation of various features. For a point feature, deviation $D_p$ between the detected feature $f_d$ and the ground truth $f_g$ is determined via an $L_2$ norm of their differences:

$$D_p(f_d, f_g) = \|f_d - f_g\|_2. \tag{4}$$

For area features, the sensitivity ($\rho$) and specificity ($\eta$) were computed, the former representing the area correctly identified by an algorithm according to an embodiment of the invention, the latter representing the surface area correctly left out when compared with the ground truth:

$$\rho = \frac{A_{TP}}{A_{TP} + A_{FN}}, \tag{5}$$

$$\eta = \frac{A_{TN}}{A_{TN} + A_{FP}}. \tag{6}$$

A similarity measure for plane features should take into account their orientation as well as location. Orientations are compared via inner product between plane normals. A deviation $D_L$ of plane locations is determined by first finding the center of the intersection contours of the individual planes, followed by computing the mean of the distances of the centers from their counterpart planes. Let $F_d$ be a detected plane feature, and $F_g$ be its ground truth counterpart, with $(n_d, l_d)$ and $(n_g, l_g)$ as respective plane normal and center of the intersection pairs. The two similarity measures, therefore, are:

$$D_O(F_d, F_d) = |\langle n_d, n_g \rangle|, \tag{7}$$

$$D_L(F_d, F_g) = \frac{1}{2}\left(\tilde{d}(F_d, l_g) + \tilde{d}(F_g, l_d)\right), \tag{8}$$

where $\langle,\rangle$ represents an inner product, and $\tilde{d}$ denotes the Euclidean distance of a point from a plane.

On the other hand, curve features are compared by using a measure that is the sum of the point similarity measures, represented by EQ. (4), computed on their end points. If $(p_{d_s}, p_{d_e})$ and $(p_{g_s}, p_{g_e})$ respectively denote the starting and ending points of a detected curve feature $C_d$ and the ground truth $C_g$, then the curve similarity measure is given by:

$$D_c(C_d, C_g) = D_p(p_{d_s}, p_{d_e}) + D_p(p_{g_s}, p_{g_e}). \tag{9}$$

Figure 13:
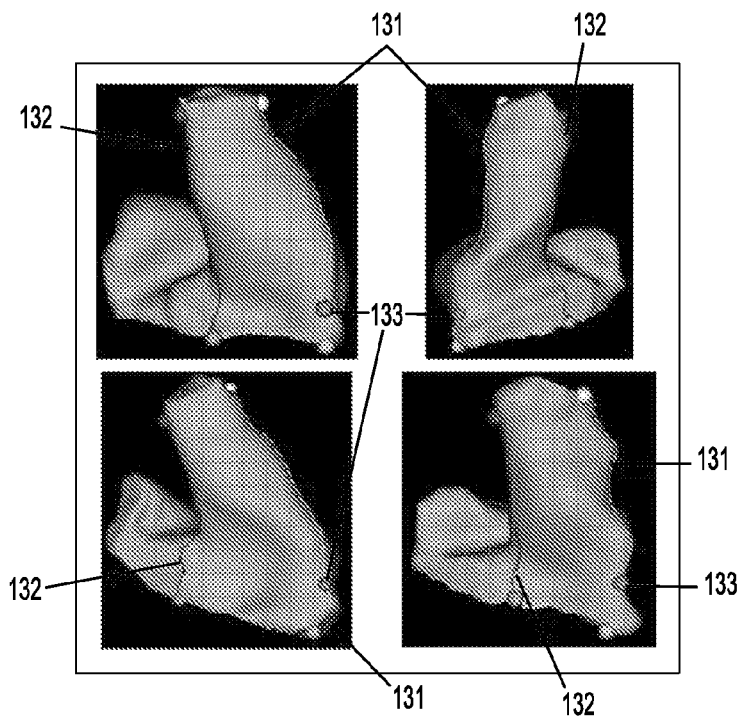
FIG. 13 illustrates the detection of inter-tragal notch, crus-side canal ridge, and inter-tragal notch flare, according to an embodiment of the invention.
Figure 14:
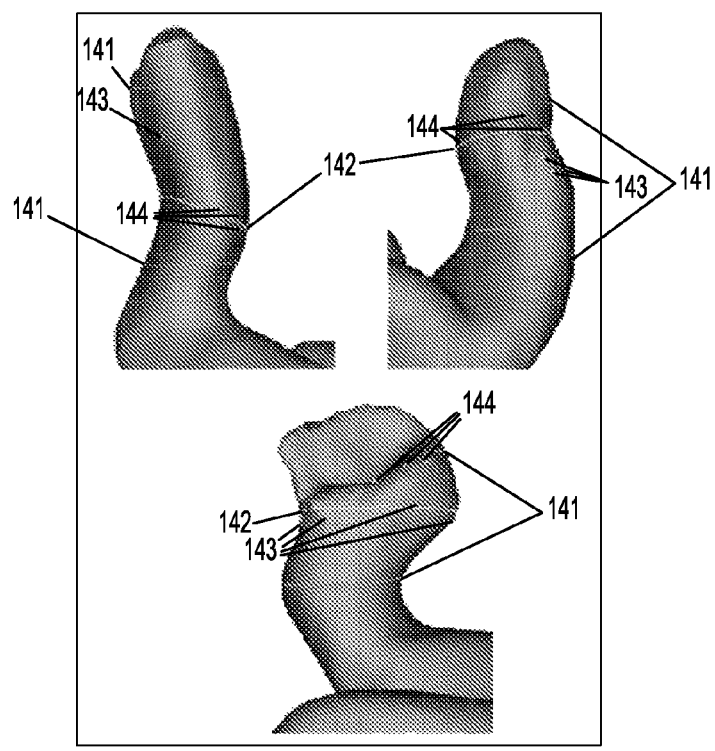
FIG. 14 illustrates three random Second Bend Plane detection results, according to an embodiment of the invention.
Figure 15:
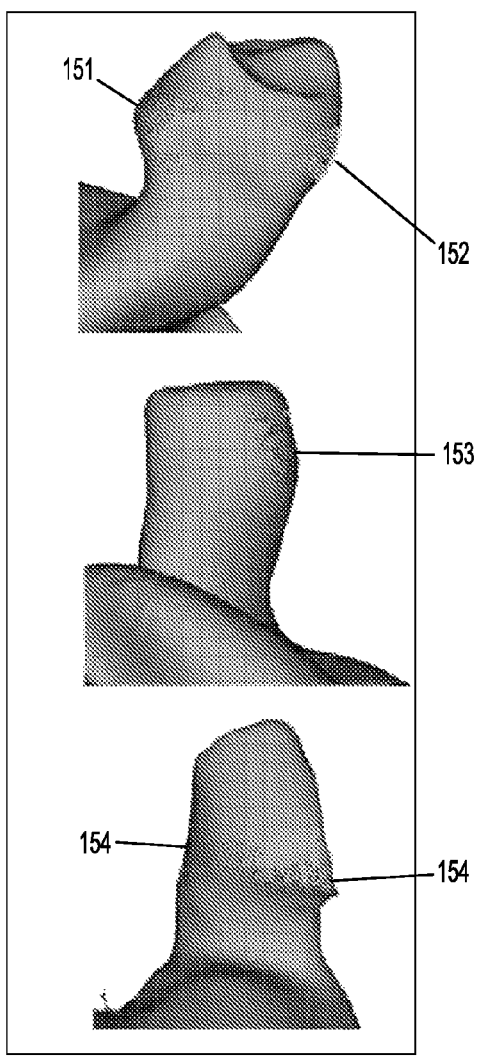
FIG. 15 illustrates three random Bulbous Canal Area detection results, according to an embodiment of the invention.

According to an embodiment of the invention, it is assumed that the ground truth is marked by an expert. A database of ear impressions for both left and right ears was used. Means and variances of the above mentioned measures were computed for all features and are tabulated in Table II, presented in FIG. 17. The units for the means and variances in Table II are millimeters. FIG. 13 illustrates the detection of the intertragal notch 131, crus-side canal ridge 132 and intertragal notch flare 133. FIG. 14 illustrates how the second bend planes were detected. The contours 141 are the bottom and top boundary of the region of interest, the contour 142 is the result of cutting the second bend plane with the mesh. Points 143 and 144 visualize the maximal curvature points of the vertical curves, where points 144 define the second bend plane. FIG. 15 shows three results for the bulbous canal area detection, with bulbous regions indicated by the dotted regions 151, 152, 153, 154. Note that not every canal is bulbous, indeed, this characteristic seems to be rather rare.

Shell Segmentation

Figure 16:
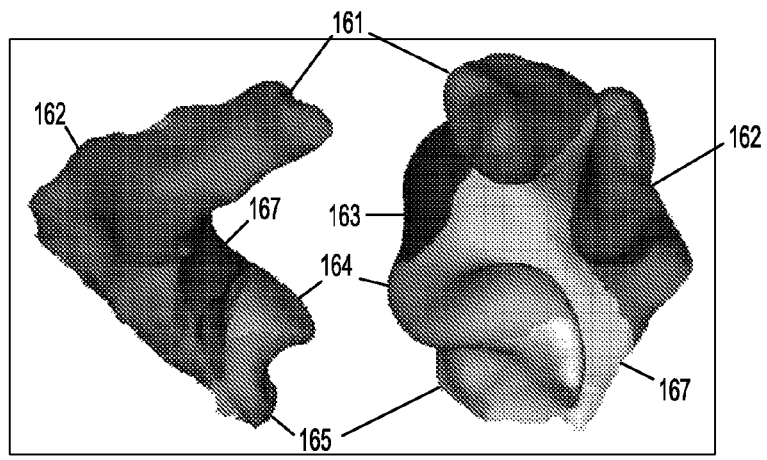
FIG. 16 illustrates feature-based shell segmentation, according to an embodiment of the invention.

One of the most fundamental tasks in surface analysis is a decomposition of a surface into meaningful regions, known as segmentation. Although many approaches have been proposed for segmentation, it is still challenging to formulate a single fully-automatic method that is general enough to support various applications. To circumvent this issue, usually some user guidance is required. One common approach in surface segmentation is manually labeling a number of vertices (surface points) related to different regions and letting the algorithm to complete the segmentation by region growing using these vertices (surface points) as seed points. According to an embodiment of the invention, automatic feature detection is used to find the seed points. FIG. 16 shows a shell surface automatically segmented into prominent anatomical regions, specifically, the canal 161, tragus 162, concha 163, helix 164, anti-helix 165, and crus 167.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 19:
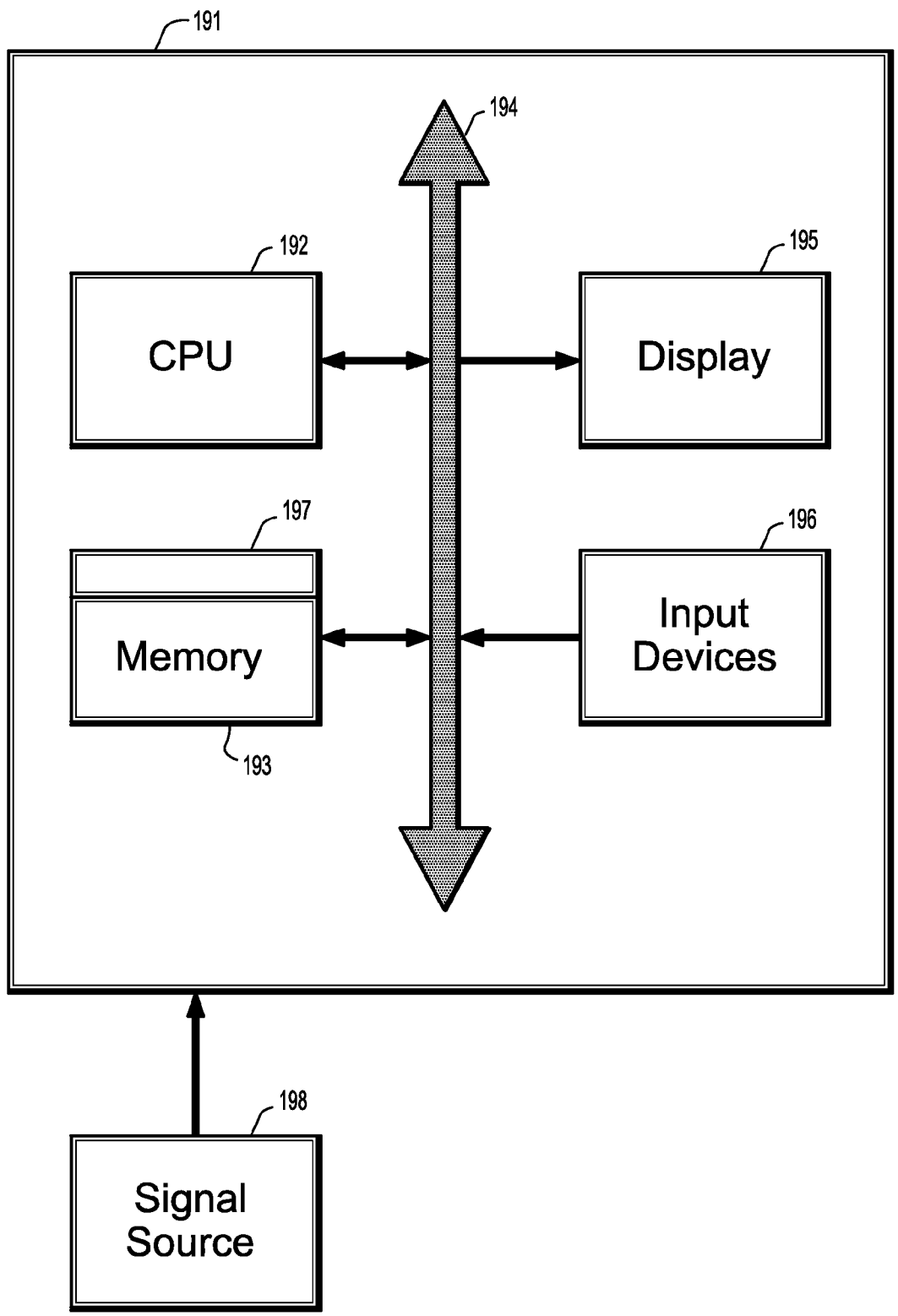
FIG. 19 is a block diagram of an exemplary computer system for implementing a method for developing a comprehensive set of anatomical features on a 3D ear impression for constructing a canonical ear signature, according to an embodiment of the invention.

FIG. 19 is a block diagram of an exemplary computer system for implementing a method for developing a comprehensive set of anatomical features on a 3D ear impression for constructing a canonical ear signature, according to an embodiment of the invention. Referring now to FIG. 19, a computer system 191 for implementing the present invention can comprise, inter alia, a central processing unit (CPU) 192, a memory 193 and an input/output (I/O) interface 194. The computer system 191 is generally coupled through the I/O interface 194 to a display 195 and various input devices 196 such as a mouse and a keyboard. The support circuits can include circuits such as cache, power supplies, clock circuits, and a communication bus. The memory 193 can include random access memory (RAM), read only memory (ROM), disk drive, tape drive, etc., or a combinations thereof. The present invention can be implemented as a routine 197 that is stored in memory 193 and executed by the CPU 192 to process the signal from the signal source 198. As such, the computer system 191 is a general purpose computer system that becomes a specific purpose computer system when executing the routine 197 of the present invention.

The computer system 191 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer implemented method for detecting anatomical features in 3D ear impressions, the method performed by said computer comprising the steps of:
receiving a 3D digital image of a 3D ear impression;
obtaining a surface of said ear impression from said 3D image;
analyzing said surface with one or more feature detectors, said detectors adapted to detecting generic features, including peak features, concavity features, elbow features, ridge features, and bump features, and derived features that depend on generic features or other derived features; and
forming a canonical ear signature from results of said detectors, wherein said canonical ear signature characterizes said 3D ear impression;
wherein detecting a concavity feature comprises:
identifying a region of interest (ROI) contained in said surface; specifying a first and second orthogonal directions along said ROI; scanning said ROI along said first direction to generate a profile of first contours in said ROI; identifying those points on each first contour having a lowest negative curvature; computing a seed point location from an average location of said points having a lowest negative curvature; scanning said ROI along said second direction to generate a profile of second contours; identifying those points on each second contour having a lowest negative curvature; correcting the seed point location by averaging over the locations of said points having a lowest negative curvature on each second contour; and growing a concave regions outward from said seed point, wherein concavity features of an ear include the tragus center, the anti-tragus center, the crus center, and the anti-helix center.

2. The method of claim 1, wherein detecting a peak feature comprises:
orienting said surface in a local coordinate system;
initializing a scanning plane whose normal is parallel to a z-axis of said coordinate system;
forming a first level set formed by intersecting said surface with said scanning plane;
forming a second level set by intersecting said surface with a scanning plane displaced in said normal direction along said surface; and
analyzing said first and second level sets to search for critical points enclosed by said level set, wherein the existence of a critical point indicates the presence of a peak feature, wherein peak features of an ear include the canal tip, concha peak, and helix peak.

3. The method of claim 2, further comprising, when no critical point was detected, displacing the scanning plane in the normal direction for a new second level set and using the previous second level set as a new first level set, and repeating said step of analyzing said first and second level sets to search for critical points.

4. The method of claim 2, wherein analyzing said first and second level sets comprises:
   comparing a number of connected components in each level set, wherein each connected component is a contour;
   identifying the level set enclosing a greater number of contours as a lower level set;
   identifying and associating corresponding contours included in the two level sets; and
   comparing an arc-length of any unassociated contour in the lower level set to a tolerance, wherein a contour whose arc-length is less than the tolerance encloses a critical point.

5. The method of claim 1, further comprising repeating steps of scanning said ROI along said first direction, identifying those points on each first contour having a lowest negative curvature, averaging said seed point location over locations of said points, scanning said ROI along said second direction, identifying those points on each second contour having a lowest negative curvature, and averaging the seed point location over the locations of said points, until said seed point location converges.

6. The method of claim 1, wherein detecting an elbow feature comprises:
   estimating a centerline of said shell surface;
   constructing a plurality of cross sectional profile contours oriented along said centerline;
   forming radial contours connecting corresponding points across said set of profile contours;
   analyzing each radial contour to identify points having a high curvature;
   discarding those points whose curvature falls below a predefined threshold; and
   analyzing all point combinations of the remaining point that define a cross sectional plane of said shell, and clustering said points in a generalized Hough space to find a plane that yields a minimal variation as identifying an elbow in said shell,
   wherein elbow features of an ear include the first bend and the second bend.

7. The method of claim 1, wherein detecting a ridge feature comprises:
   finding a starting point and an ending point of a ridge on said surface; and
   computing a geodesic connecting said starting and ending points that minimizes a cost functional of a curve connecting said starting and ending points wherein the said cost functional is constructed as the length of the geodesic weighted by a decreasing function of curvature of each point along said curve, wherein said ridge is defined by said geodesic,
   wherein ridge features of an ear include the intertragal notch, the crus-side canal ridge, and the crus-helix ridge.

8. The method of claim 1, wherein detecting a bump feature comprises:
   constructing a plurality of cross sectional profile contours along said surface;
   selecting a contour at one end of said plurality of contours as a reference contour;
   for each other contour in said plurality of contours, comparing an area of the reference contour with the area of a current contour in said plurality of contours;
   finding bump points on said current contour, wherein an area enclosed by said current contour exceeds that of said reference contour by a predetermined threshold; and
   collecting said bump points into areas by region growing from each bump point, wherein bump features of an ear include the canal bulbous.

9. The method of claim 8, further comprising updating said reference contour with a current contour, wherein a difference of areas enclosed by said current contour and of said reference contour is less than said predetermined threshold.

10. The method of claim 8, wherein finding bump points on said current contour comprises:
    projecting points on the current contour onto the plane of the reference contour;
    finding a closest point on the reference contour for each projected current point, to form a pair of corresponding points;
    comparing a distance of a projected current point to a projected centroid of the current contour to a distance of the corresponding reference point to a centroid of the reference contour, for each corresponding point pair; and
    determining that the projected current point is bump if the distance to its centroid is greater than the corresponding distance of the reference contour point by a predetermined threshold.

11. The method of claim 8, wherein an area enclosed by a contour is calculated from $$\sum_{j=0}^{|c_p|-1} \text{Area}\Delta_j,$$

wherein $c_p$ is a contour, $|c_p|$ is a cardinality of a discretized representation of $c_p$, and $\Delta_j$ is a triangle spanned by the centroid $\hat{c}_p$ of the contour $c_p$ and two successive contour points $p_j$ and $p_{j+1}$.

12. The method of claim 8, wherein region growing for each bump point comprises collecting convex surface points with curvature greater than a predefined threshold.

13. A non-transitory computer-readable storage medium, tangibly embodying a program of instructions executable by a computer to perform the method steps for detecting anatomical features in 3D ear impressions, the method comprising the steps of:
    receiving a 3D digital image of a 3D ear impression;
    obtaining a surface of said ear impression from said 3D image;
    analyzing said surface with one or more feature detectors, said detectors adapted to detecting generic features, including peak features, concavity features, elbow features, ridge features, and bump features, and derived features that depend on generic features or other derived features; and
    forming a canonical ear signature from results of said detectors, wherein said canonical ear signature characterizes said 3D ear impression;
    wherein detecting a concavity feature comprises:
    identifying a region of interest (ROI) contained in said surface; specifying a first and second orthogonal directions along said ROI; scanning said ROI along said first direction to generate a profile of first contours in said ROI; identifying those points on each first contour having a lowest negative curvature; computing a seed point location from an average location of said points having a lowest negative curvature; scanning said ROI along said second direction to generate a profile of second contours; identifying those points on each second contour having a lowest negative curvature; correcting the seed point location by averaging over the locations of said points having a lowest negative curvature on each second contour; and growing a concave regions outward from said seed point, wherein concavity features of an ear include the tragus center, the anti-tragus center, the crus center, and the anti-helix center.

14. The computer readable program storage device of claim 13, wherein detecting a peak feature comprises:
orienting said surface in a local coordinate system;
initializing a scanning plane whose normal is parallel to a z-axis of said coordinate system;
forming a first level set formed by intersecting said surface with said scanning plane;
forming a second level set by intersecting said surface with a scanning plane displaced in said normal direction along said surface; and
analyzing said first and second level sets to search for critical points enclosed by said level set, wherein the existence of a critical point indicates the presence of a peak feature, wherein peak features of an ear include the canal tip, concha peak, and helix peak.

15. The computer readable program storage device of claim 14, the method further comprising, when no critical point was detected, displacing the scanning plane in the normal direction for a new second level set and using the previous second level set as a new first level set, and repeating said step of analyzing said first and second level sets to search for critical points.

16. The computer readable program storage device of claim 14, wherein analyzing said first and second level sets comprises:
comparing a number of connected components in each level set, wherein each connected component is a contour;
identifying the level set enclosing a greater number of contours as a lower level set;
identifying and associating corresponding contours included in the two level sets; and
comparing an arc-length of any unassociated contour in the lower level set to a tolerance, wherein a contour whose arc-length is less than the tolerance encloses a critical point.

17. The computer readable program storage device of claim 13, the method further comprising repeating steps of scanning said ROI along said first direction, identifying those points on each first contour having a lowest negative curvature, averaging said seed point location over locations of said points, scanning said ROI along said second direction, identifying those points on each second contour having a lowest negative curvature, and averaging the seed point location over the locations of said points, until said seed point location converges.

18. The computer readable program storage device of claim 13, wherein detecting an elbow feature comprises:
estimating a centerline of said shell surface;
constructing a plurality of cross sectional profile contours oriented along said centerline;
forming radial contours connecting corresponding points across said set of profile contours;
analyzing each radial contour to identify points having a high curvature;
discarding those points whose curvature falls below a predefined threshold; and
analyzing all point combinations of the remaining point that define a cross sectional plane of said shell, and clustering said points in a generalized Hough space to find a plane that yields a minimal variation as identifying an elbow in said shell,
wherein elbow features of an ear include the first bend and the second bend.

19. The computer readable program storage device of claim 13, wherein detecting a ridge feature comprises:
finding a starting point and an ending point of a ridge on said surface; and
computing a geodesic connecting said starting and ending points that minimizes a cost functional of a curve connecting said starting and ending points wherein the said cost functional is constructed as the length of the geodesic weighted by a decreasing function of curvature of each point along said curve, wherein said ridge is defined by said geodesic,
wherein ridge features of an ear include the intertragal notch, the crus-side canal ridge, and the crus-helix ridge.

20. The computer readable program storage device of claim 13, wherein detecting a bump feature comprises:
constructing a plurality of cross sectional profile contours along said surface;
selecting a contour at one end of said plurality of contours as a reference contour;
for each other contour in said plurality of contours,
comparing an area of the reference contour with the area of a current contour in said plurality of contours;
finding bump points on said current contour, wherein an area enclosed by said current contour exceeds that of said reference contour by a predetermined threshold; and
collecting said bump points into areas by region growing from each bump point, wherein bump features of an ear include the canal bulbous.

21. The computer readable program storage device of claim 20, the method further comprising updating said reference contour with a current contour, wherein a difference of areas enclosed by said current contour and of said reference contour is less than said predetermined threshold.

22. The computer readable program storage device of claim 20, wherein finding bump points on said current contour comprises:
projecting points on the current contour onto the plane of the reference contour;
finding a closest point on the reference contour for each projected current point, to form a pair of corresponding points;
comparing a distance of a projected current point to a projected centroid of the current contour to a distance of the corresponding reference point to a centroid of the reference contour, for each corresponding point pair; and
determining that the projected current point is bump if the distance to its centroid is greater than the corresponding distance of the reference contour point by a predetermined threshold.

23. The computer readable program storage device of claim 20, wherein an area enclosed by a contour is calculated from $$\sum_{j=0}^{|c_p|-1} \text{Area}\Delta_j,$$

wherein $c_p$ is a contour, $|c_p|$ is a cardinality of a discretized representation of $c_p$, and $\Delta_j$ is a triangle spanned by the centroid of the contour $\hat{c}_p$ and two successive contour points $p_j$ and $p_{j+1}$.

24. The computer readable program storage device of claim 20, wherein region growing for each bump point comprises collecting convex surface points with curvature greater than a predefined threshold.

* * * * *